Sept. 19, 1961  L. E. FROSLIE  3,000,230
HYDRODYNAMIC TRANSMISSION
Filed Feb. 18, 1957  12 Sheets-Sheet 9
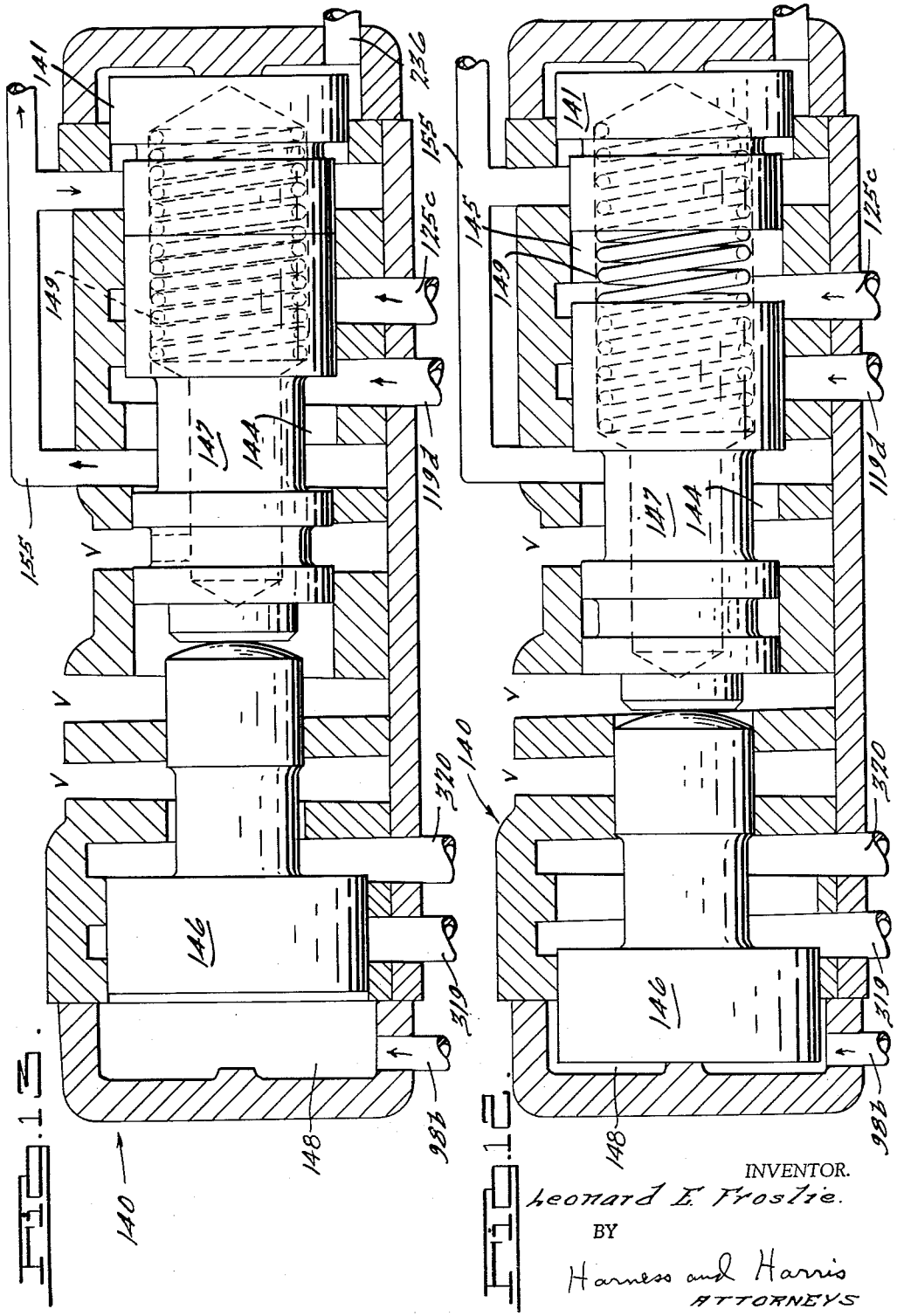
INVENTOR.
Leonard E. Froslie.
BY
Harness and Harris
ATTORNEYS

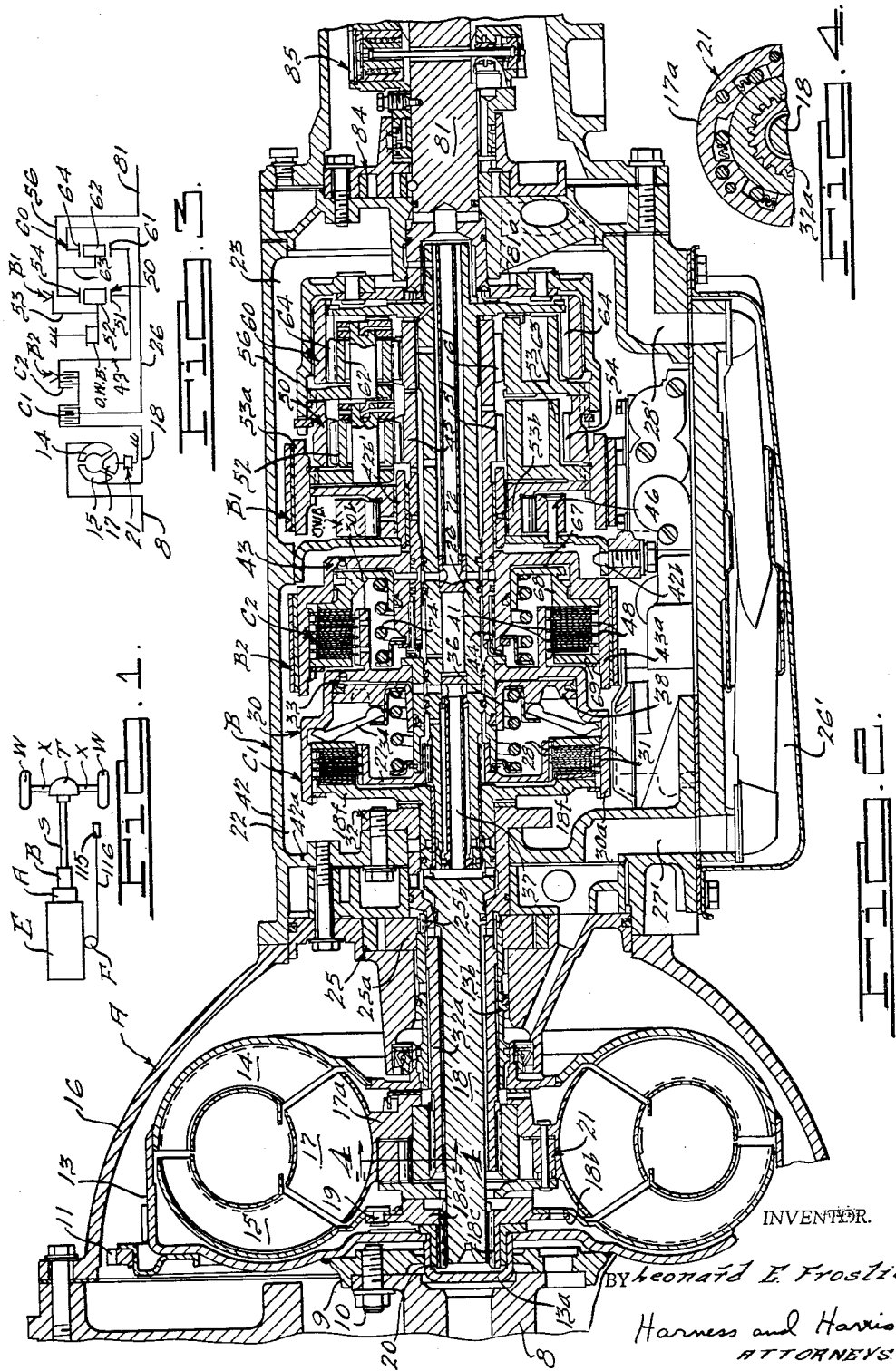

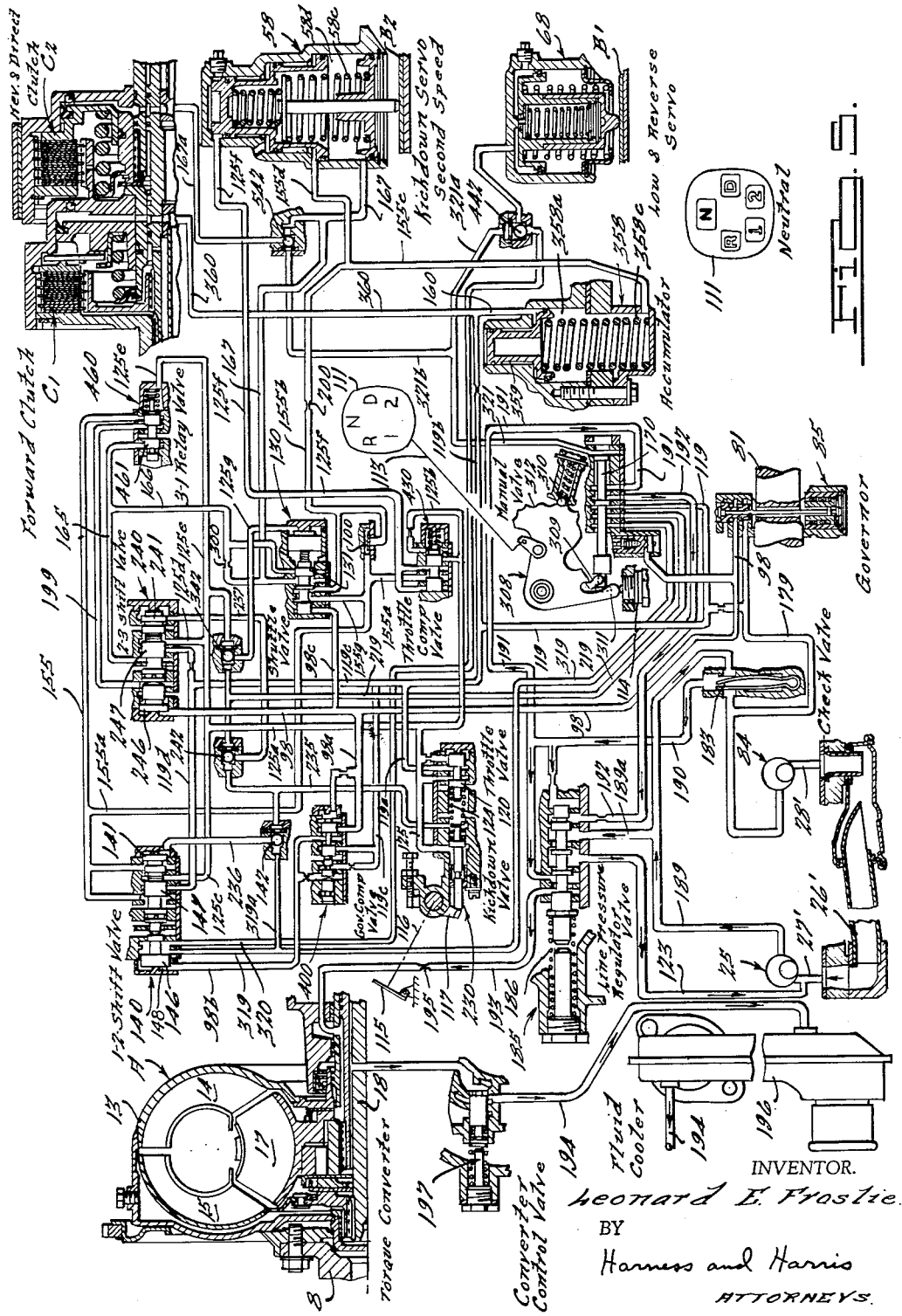

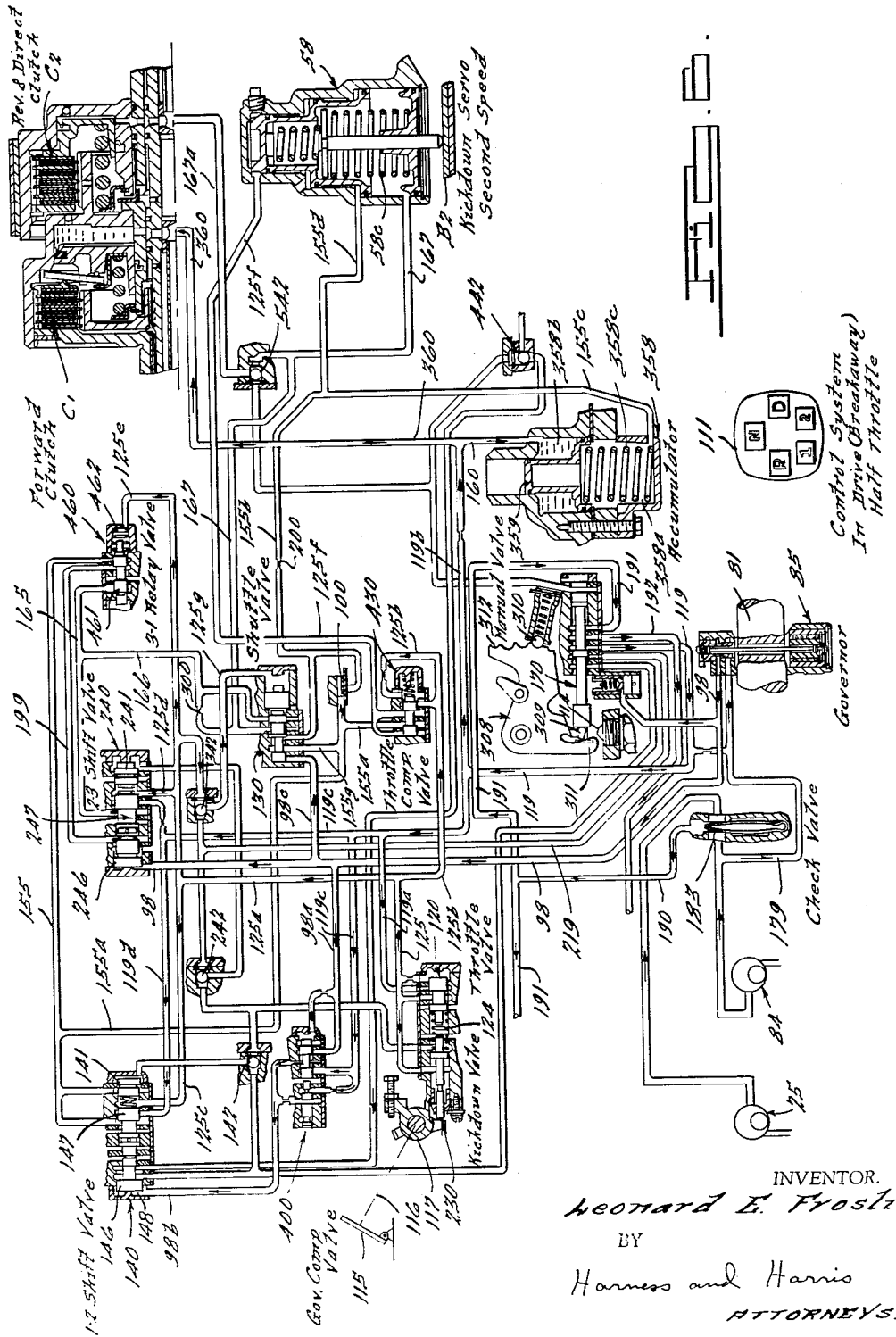

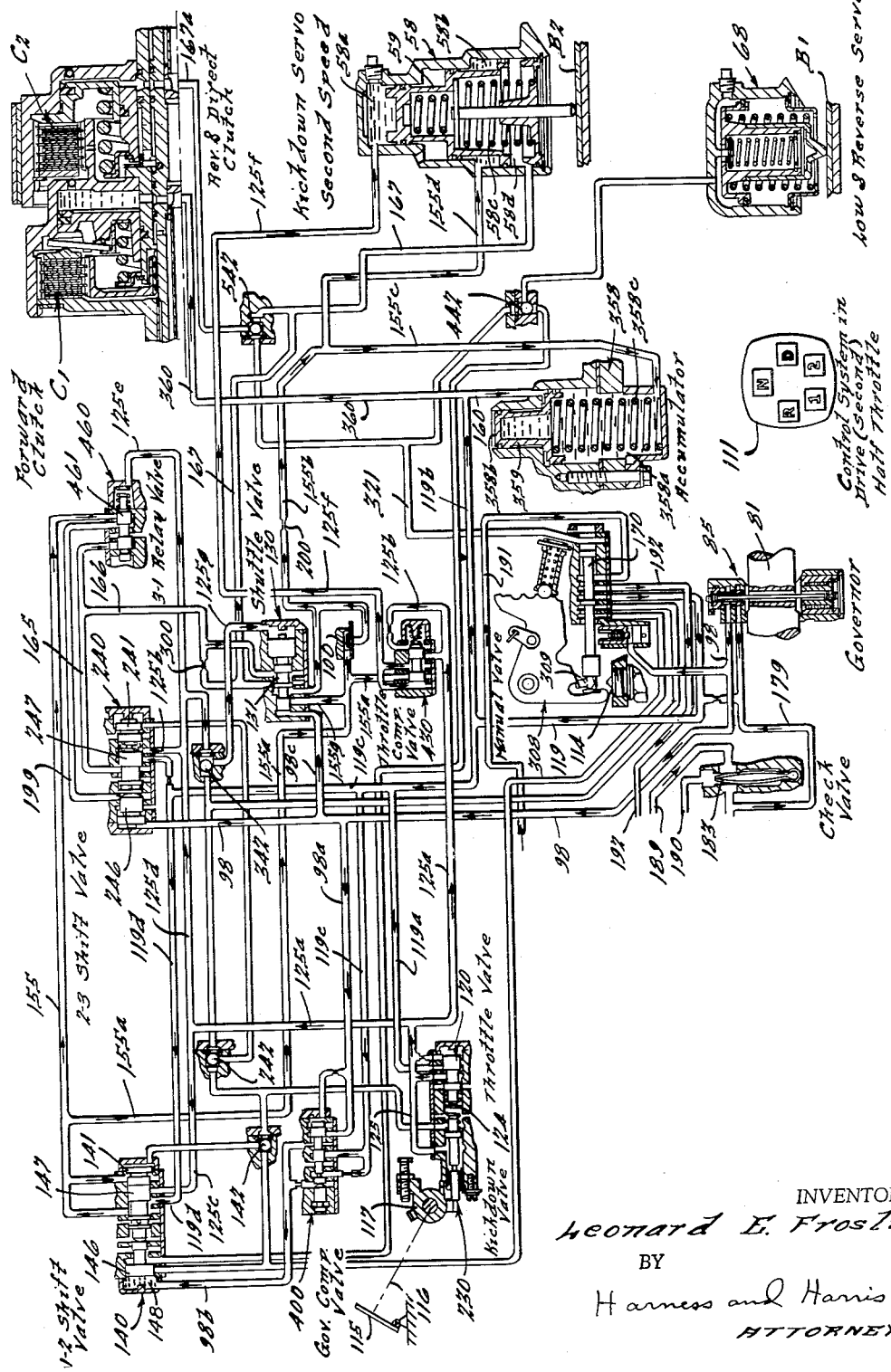

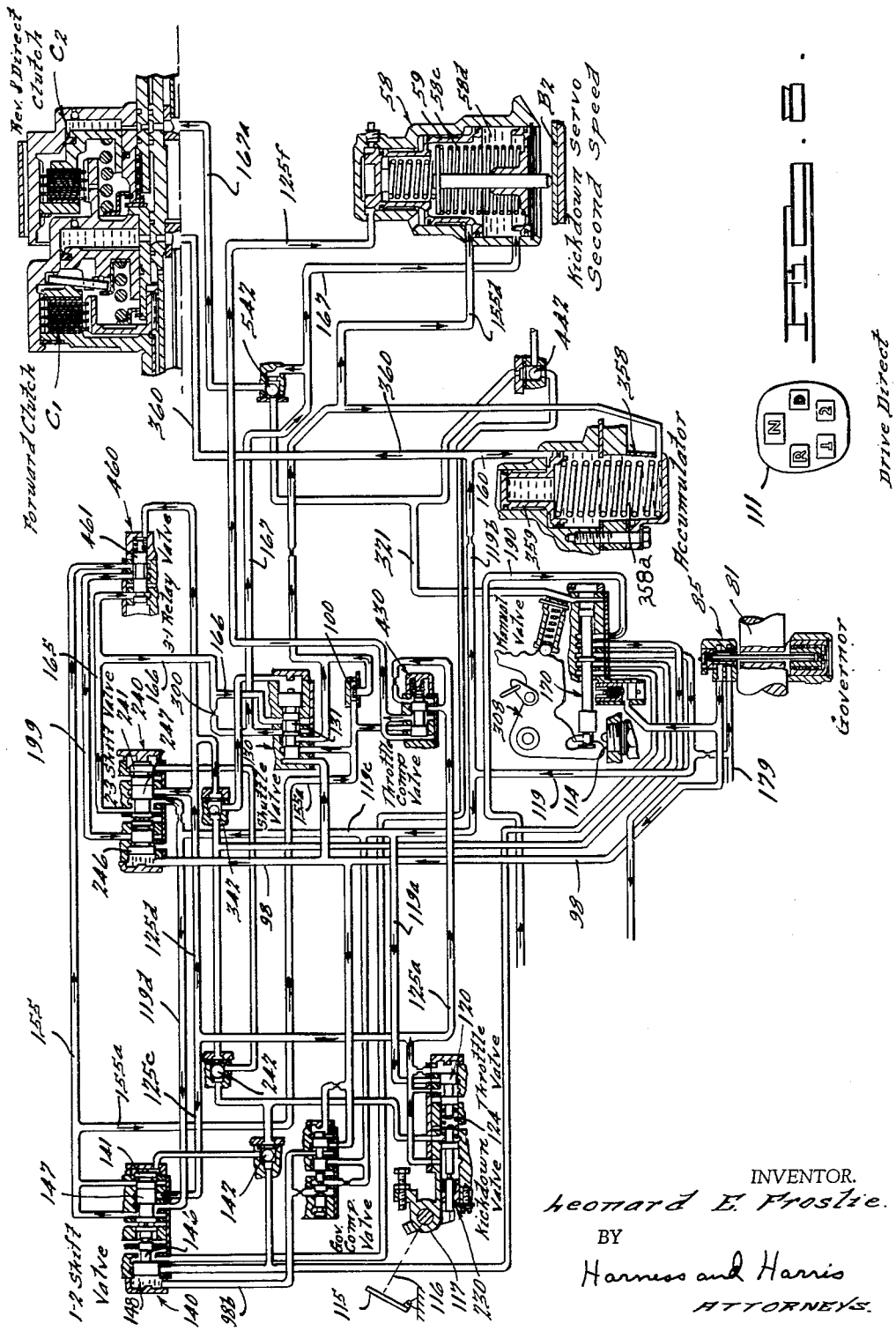

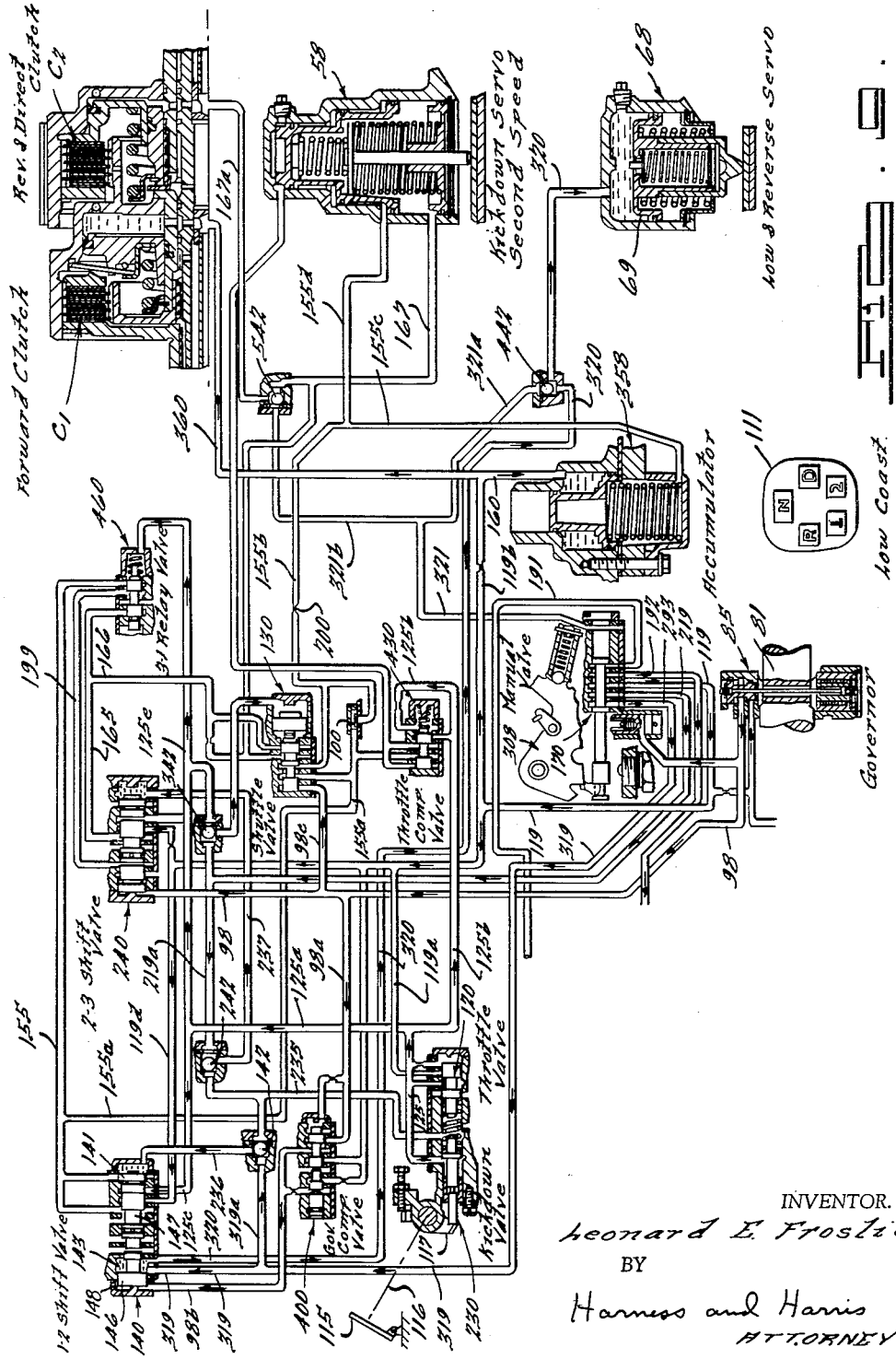

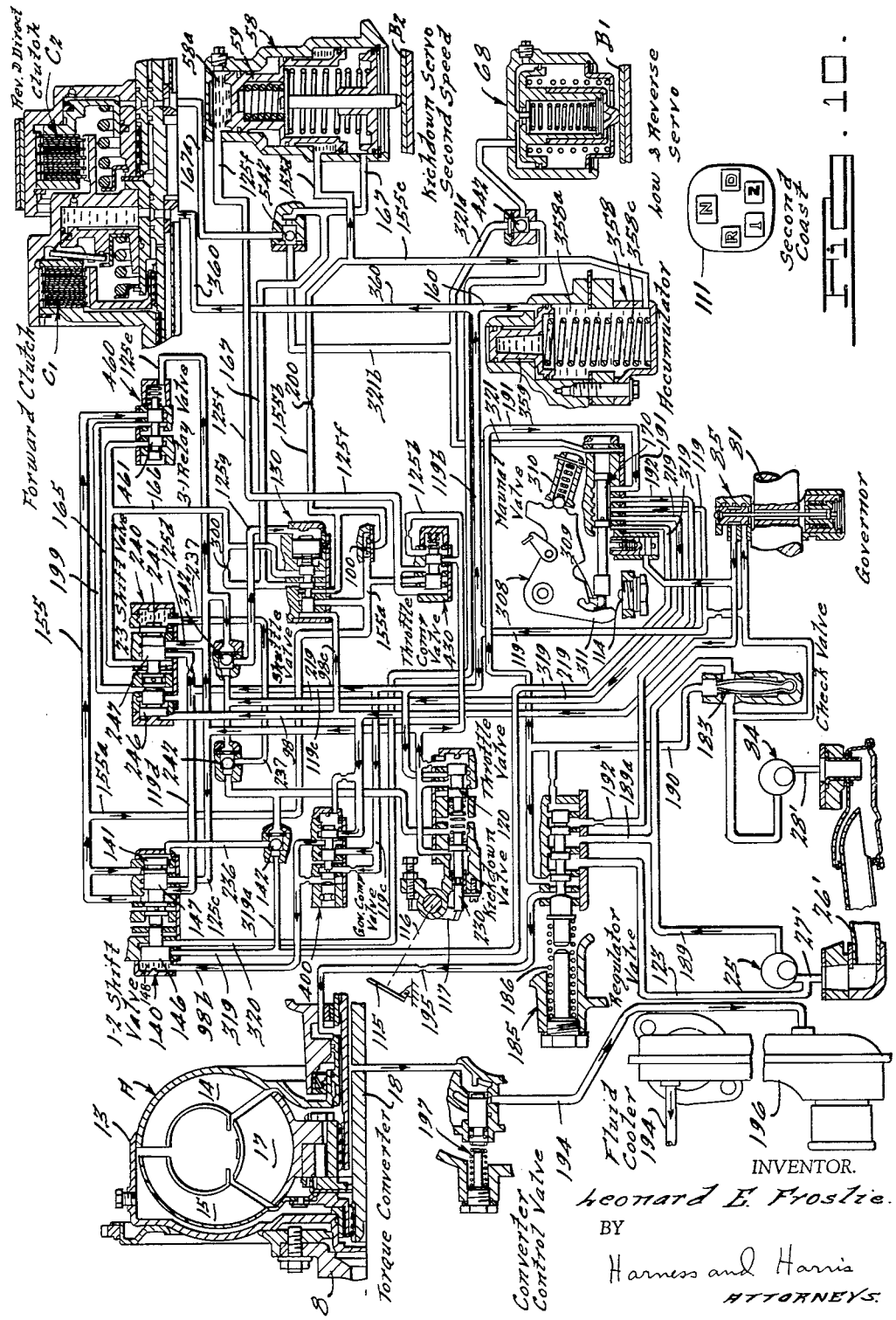

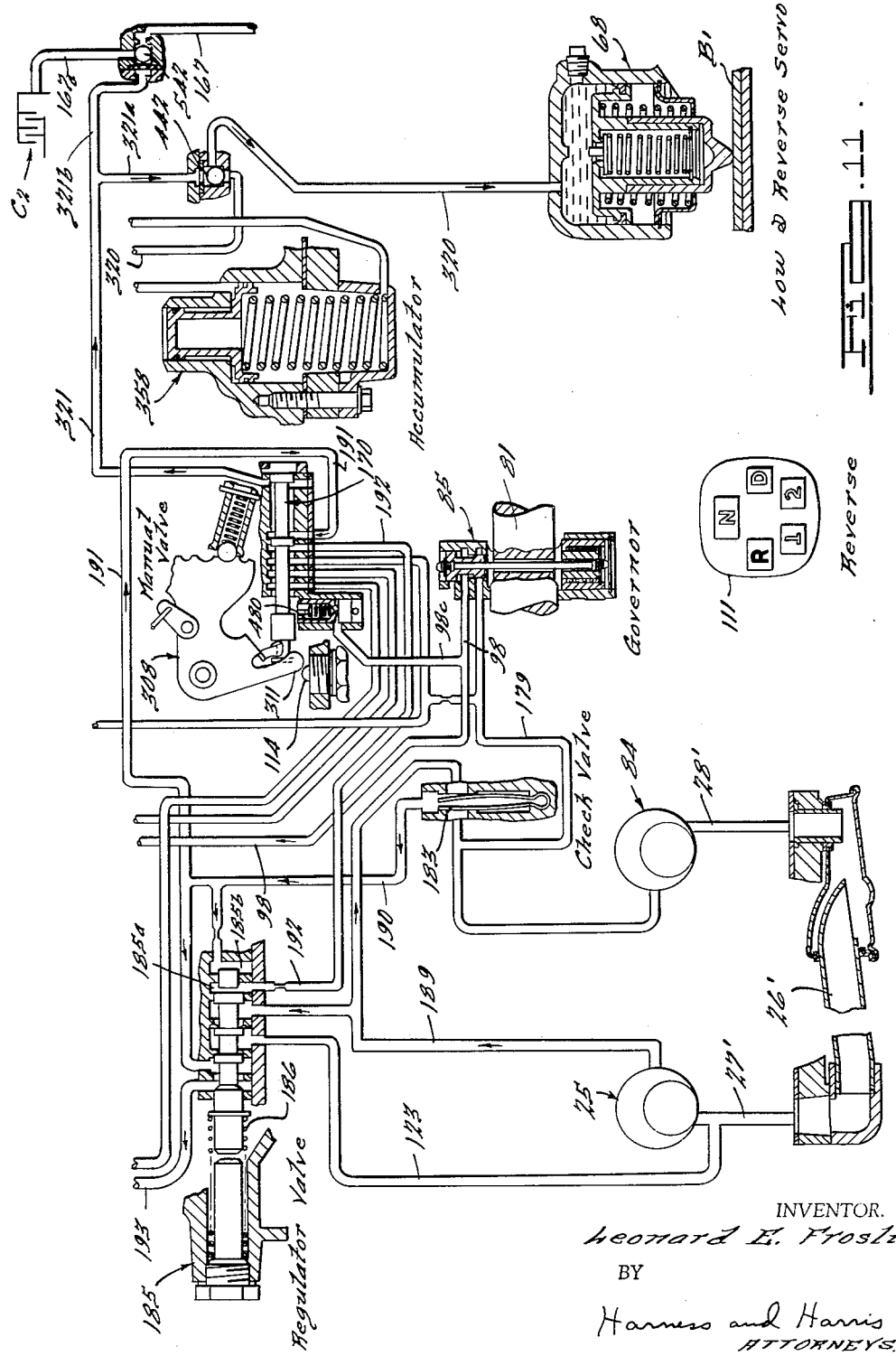

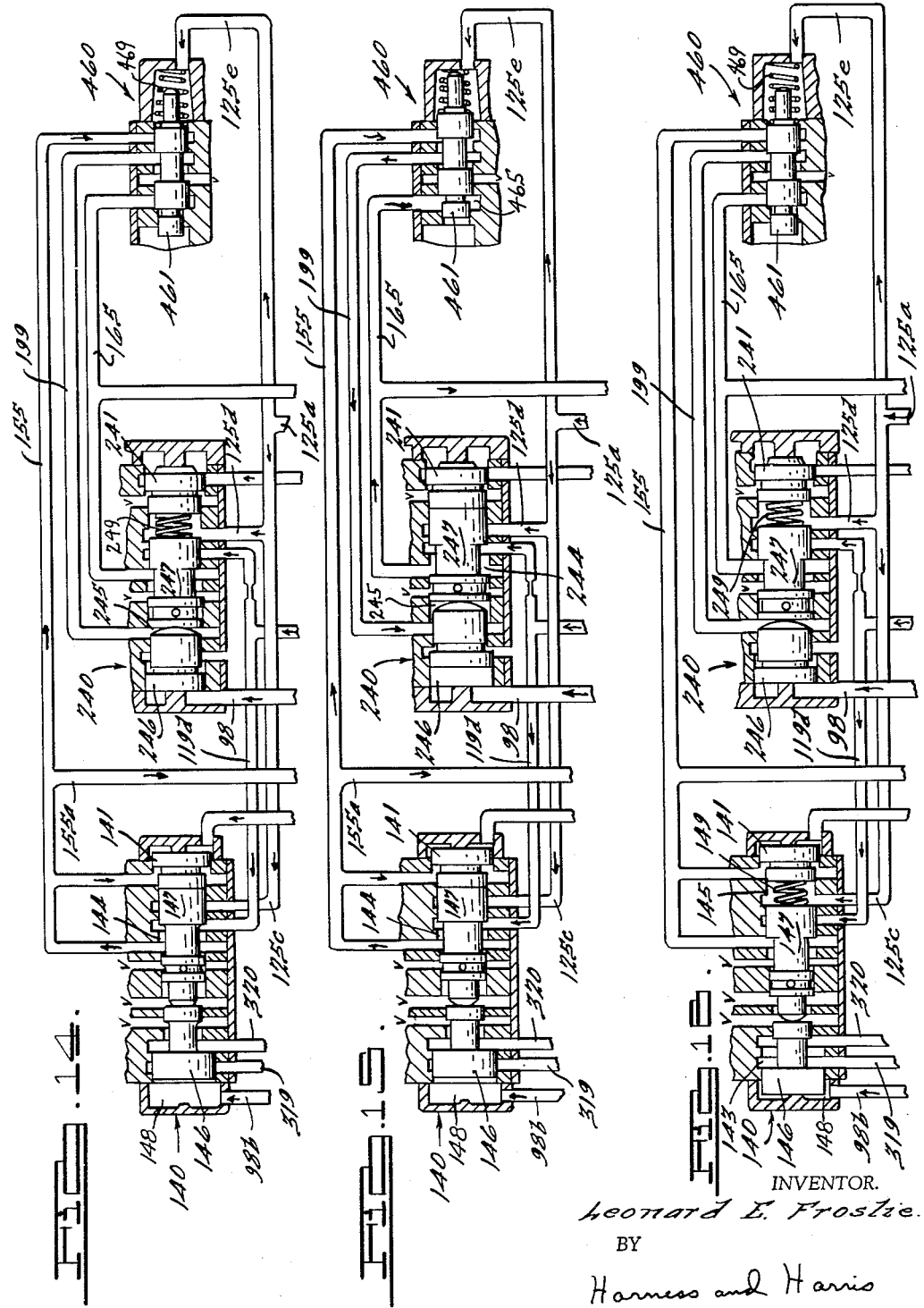

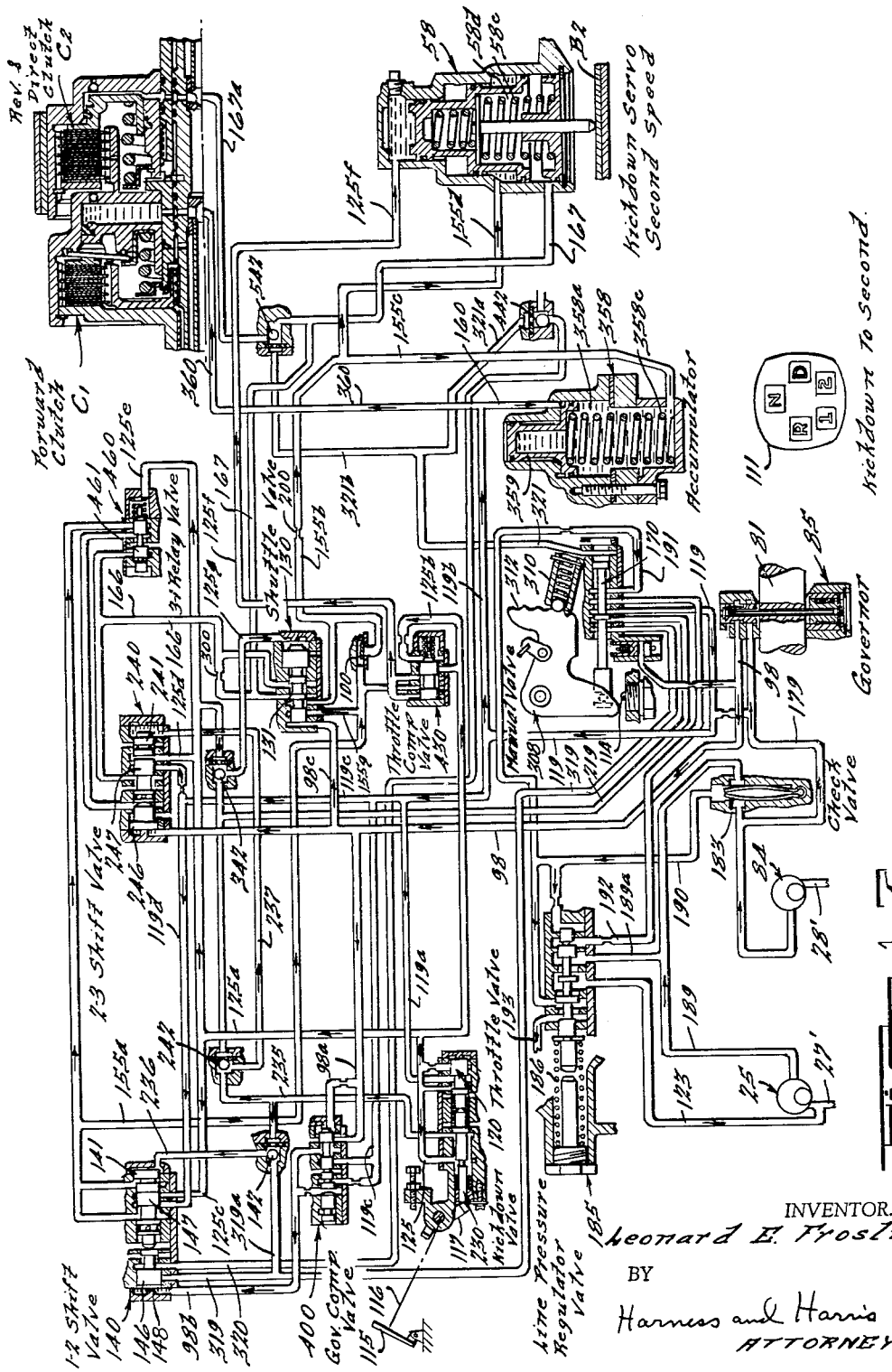

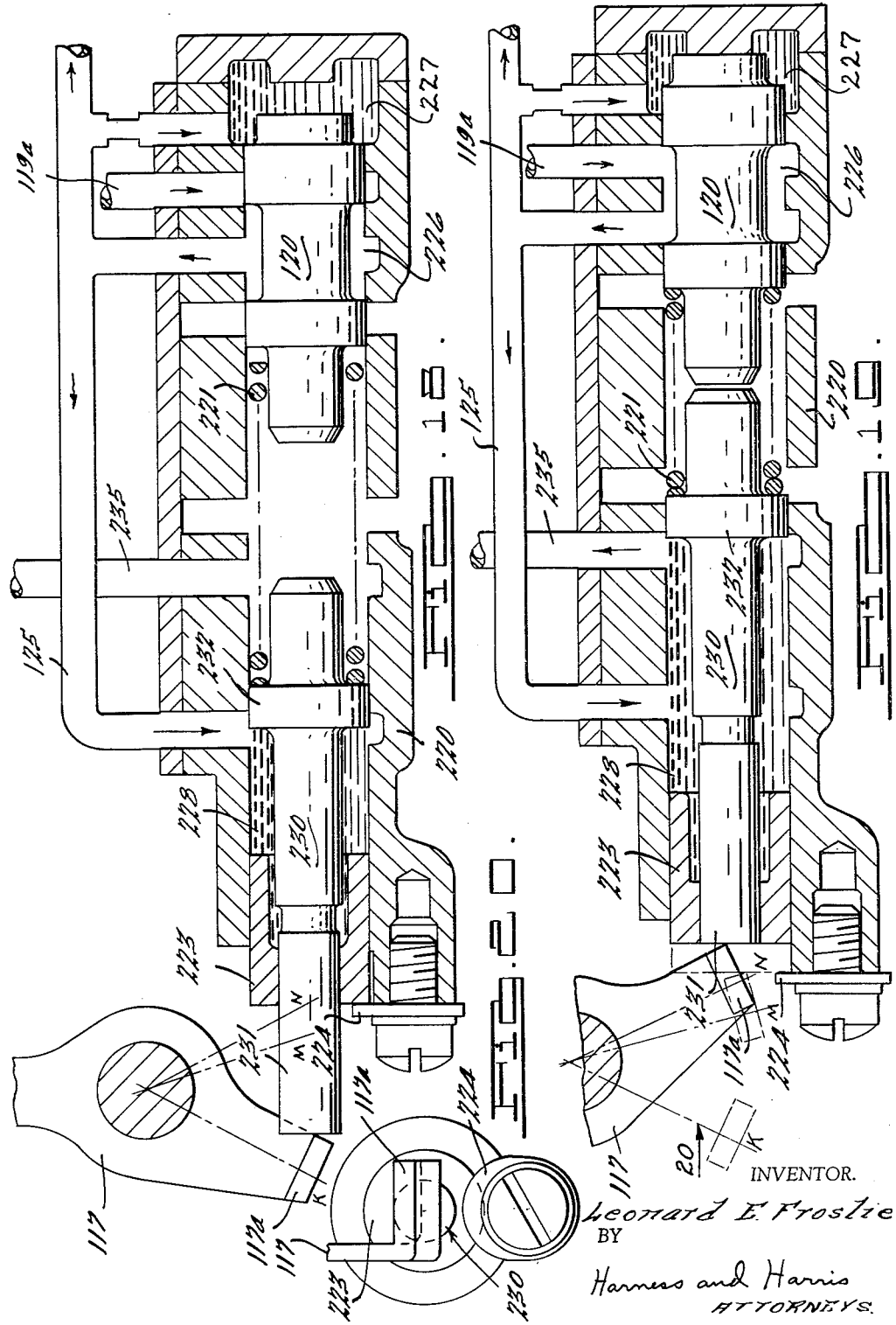

United States Patent Office 3,000,230
Patented Sept. 19, 1961

3,000,230
HYDRODYNAMIC TRANSMISSION
Leonard E. Froslie, Detroit, Mich., assignor to Chrysler Corporation, Highland Park, Mich., a corporation of Delaware
Filed Feb. 18, 1957, Ser. No. 640,804
38 Claims. (Cl. 74—472)

This invention relates to a power transmission unit primarily intended for motor vehicle use and is particularly concerned with the controls for a transmission of this type that will function to automatically provide three (3) forward drive speeds and/or two (2) forward speeds with novel means for controlling the changes in speed ratio in both upshifting and downshifting sequence. A transmission of this type as shown in the copending application of Bert W. Cartwright et al., Serial No. 462,212, filed October 14, 1954, now U.S. Patent 2,932,990.

It is a primary object of this invention to provide a three forward speeds and reverse drive transmission that utilizes the minimum number and the least complicated transmission elements with said elements arranged in a novel manner so as to provide the most favorable construction for a highly flexible, smoothly operating, automatic transmission control system.

It is another object of this invention to provide a simplified three forward speeds and reverse drive transmission adapted for automatic and manual control that utilizes a pair of simple planetary gear sets in combination with a one-way brake and a pair of friction clutches and a novel type of hydraulically operated control system.

It is still another object of this invention to provide a novel type of control system for a three speed automatically operable transmission wherein a one-way brake is utilized in a novel arrangement to permit a new and improved type of speed ratio change shift pattern.

Other objects and advantages of this invention will become readily apparent from a consideration of the subsequent description and the related drawings wherein:

FIG. 1 is a schematic view of a motor vehicle drive train that includes a power transmission unit embodying this invention;

FIG. 2 is a sectional elevational view of the power transmission unit utilized in the disclosed drive train of FIG. 1;

FIG. 3 is a schematic line diagram of the power transmission unit shown in FIG. 2;

FIG. 4 is an enlarged, fragmentary sectional, elevational view of the one-way brake mechanism associated with the guide wheel of the drive train torque converter device, the view being taken on the line 4—4 of FIG. 1;

FIG. 5 is a diagrammatic view of the hydraulically operated control system for the transmission shown in FIG. 2, the controls being shown in Neutral condition;

FIG. 6 is another diagrammatic view of portions of the transmission control system with the controls being shown set in Drive and the transmission conditioned for Breakaway or first forward speed;

FIG. 7 is another diagrammatic view of portions of the transmission control system with the controls being shown set in Drive and the transmission conditioned for second forward speed;

FIG. 8 is another diagrammatic view of portions of the transmission control system with the controls being shown set in Drive and the transmission conditioned for third forward speed or direct drive;

FIG. 9 is another diagrammatic view of portions of the transmission control system with the controls shown set for operation in the two-way drive first forward speed;

FIG. 10 is another diagrammatic view of portions of the transmission control system with the controls shown set for automatic operation in the first and second speed forward drives;

FIG. 11 is another diagrammatic view of portions of the transmission control system with the controls shown set for reverse drive;

FIG. 12 is an enlarged, sectional elevational view of the 1—2 shift valve shown in its downshifted position;

FIG. 13 is an enlarged, sectional elevational view of the 1—2 shift valve shown in its upshifted position;

FIGS. 14, 15, and 16 are fragmentary diagrammatic views of the interconnected shift valves and the 3—1 relay valve, the views showing the several valves in their second speed, third speed and first speed positions respectively;

FIG. 17 is a diagrammatic view of portions of the transmission control system with the controls being shown set for Drive but the accelerator depressed to effect a kickdown to second speed;

FIG. 18 is an enlarged sectional elevational view of the throttle and kickdown valve unit with the throttle valve only partially open and the kickdown valve in its normal inactive position;

FIG. 19 is a view similar to FIG. 18 but showing the throttle valve substantially wide open and the kickdown valve moved to its kickdown position; and FIG. 20 is an end elevation of the valve shown in FIG. 19, the view being taken looking in the direction of the arrow 20 of FIG. 19 to show the kickdown valve operator.

FIG. 1 of the drawings diagrammatically discloses a motor vehicle power plant and drive train comprising an internal combustion engine E drivingly connected to a power transmission unit that consists of the hydrokinetic type of torque converter device A drivingly connected to a change speed gear box B. The output from gear box B drives a propeller shaft or drive shaft S that transmits drive through a differential unit T and axles X to the rear driving wheels W of the vehicle. The engine E has a carburetor F that is controlled by an accelerator pedal 115 through linkage 116.

FIG. 2 of the drawings discloses the power transmission unit structure that consists of the hydrokinetic torque converter device A and the change speed gear box B that are arranged in a series connected drive transmitting relationship. The reference numeral 8 represents an end portion of a driving member, such as the crankshaft of the engine E of the motor vehicle power plant. The shaft 8 is drivingly connected to the drive transmitting ring 9 by the screw means 10. The drive transmitting ring 9 is drivingly connected to the torque converter casing 13. The converter casing 13 has an engine starter ring gear 11 mounted on and extending about its periphery. Within the torque converter casing 13 are mounted the several vaned converter wheel elements, namely, the impeller or pump member 14, the turbine or runner member 15, and the guide or reaction member 17. A pair of guide wheels may be used in place of the single guide wheel 17.

The vaned impeller wheel 14 is formed as an integral part of the converter casing 13 and is accordingly adapted to be rotatably driven by the driving shaft 8. The vaned turbine wheel 15 is drivingly connected by rivet means 19 to a radially extending flange portion 18b formed on the shaft hub member 18a of shaft 18. Shaft hub member 18a is drivingly connected by splines 18c to the forward end portion of the torque converter driven shaft member 18.

The converter driven shaft member 18 is adapted to transmit drive from the turbine member 15 of the torque converter device A to the planetary gearing of the gear box unit B that is arranged rearwardly of and in series with the torque converter device A. The converter driven shaft 18 thus provides the input shaft to the gear box B. The forward end of shaft 18 is journalled in a bearing 20 that is piloted in an axially extending seat 13a formed in the hub of the torque converter casing 31. The rear end portion of converter driven shaft 18 is rotatably supported by the sleeve plate 32 carried by the front wall 42a of the gear box housing 42.

The vaned converter guide wheel 17 is rotatably mounted within the converter casing 13 by means of the guide wheel hub portion 17a. Guide wheel hub portion 17a is supported by means of the one-way brake device 21, on the axially extending sleeve portion 32a of the anchored sleeve plate 32. The one-way brake 21 (see FIG. 4) is arranged such that it will permit only forward rotary movement (clockwise when looking from the converter A towards the gear box B) to be transmitted to the guide wheel 17 by the forward rotation of the impeller 14. The brake 21 continuously prevents rotation of the guide wheel 17 in a reverse or counterclockwise direction. The specific one-way brake 21 herein disclosed is shown in section in FIG. 4.

The torque converter unit A includes a gear type oil pump 25 having a driving gear 25a that is directly connected by key means 25b to the rearwardly projecting end of an axially extending, sleevelike, flange portion 13b of the rotatable converter casing 13. The pump 25 draws oil from a supply sump 26' through supply conduit 27' and circulates this oil through the converter A, the transmission unit lubricating system and the various hydraulically operated control mechanisms associated with this power transmission unit (see FIG. 5). A second pump 84, driven by the transmission output shaft 81, is also included in this transmission unit. The second pump 84 provides a second source of pressure fluid for operation of the various aforementioned hydraulically operated devices and insures a pressure fluid supply even at times when the engine driven pump 25 might not be operating. Pump 84 will thus provide pressurized fluid during pushed or towed starting as well as during engine driven operation of the vehicle. Pump 84 is connected to the oil supply sump 26' by the conduit 28'.

The gear box B includes the forward drive clutch $C_1$, the direct drive clutch $C_2$, and the pair of planetary gear trains 50 and 60 that are adapted to cooperate with the torque converter device A to provide means for the transmission of three forward drives and a reverse drive to the propeller shaft S. The forward drive clutch $C_1$ is engaged whenever any of the three forward speeds is being utilized and it is disengaged when the transmission controls are set for either Neutral or Reverse. The direct drive clutch $C_2$ is engaged only when the 3rd or Direct forward speed is being transmitted or when Reverse drive is being transmitted. The different clutches and brakes that are applied for transmitting the several drive ratios obtainable with this transmission are set forth in the chart below—

Drive ratio: Members applied
  Low (1st) _____ $C_1$ and $B_1$ or O.W.B.
  Kickdown (2nd) _____ $C_1$ and $B_2$.
  Direct (3rd) _____ $C_1$ and $C_2$.
  Reverse _____ $C_2$ and $B_1$.

The gear box B is enclosed by the housing 42 which includes a front compartment 22 and a rear compartment 23 which compartments are separated by the centrally located housing partition 42b.

In the front compartment 22 are located the clutches $C_1$ and $C_2$ whereas the rear compartment 23 houses the two planetary gear sets 50 and 60. The rear end of the converter driven gear box input shaft 18 pilots the forward end of the gear box intermediate shaft 26. Shaft 26 has its rear end portion piloted in the forward end of the transmission output shaft 81. Transmission shaft 26 drivingly mounts a spider element 27 at its forward end. The spider element 27 carries the clutch disc elements 28 that form a part of the forward drive clutch $C_1$. Transmission shaft 26 also drivingly mounts a planetary ring gear element 64 at its rear end. The ring gear element 64 provides the drive input element to the planetary gear sets 50 and/or 60 when the transmission is set for any of the forward drive ratios, as will subsequently become apparent.

The rear end of the converter driven gear box input shaft 18 carries a radially extending flange 18f to which is drivingly mounted the clutch drum element 30. Portion 30a of the drum 30 drivingly mounts the clutch discs 31 that are adapted to be drivingly engaged with the aforementioned clutch discs 28 carried by the transmission shaft 26. Clutch discs 28, 31 are arranged to be engaged by the forward movement of the piston 38 upon the admission of pressurized fluid to the drum carried cylinder bore 33. The clutch engaging forward movement of the piston 38 is transmitted to the clutch discs 28, 31 by the rockable levers 34 and the reciprocable pressure plate 35. Compression spring 36 normally urges the piston 38 rearwardly to a clutch disengaged position. Pressure fluid for causing the engagement of forward drive clutch $C_1$ is supplied to the cylinder 33 by way of conduit 37. The actual details of clutch $C_1$ are set forth in the application of David P. Hass Serial No. 633,487, filed January 10, 1957, now U.S. Patent 2,880,835. It is thought to be apparent from the foregoing description that when forward drive clutch $C_1$ is engaged then drive is transmitted directly from the torque converter driven shaft 18 to the gear box input shaft 26 and to the ring gear element 64 of the rearwardly located planetary gear set 60.

Mounted on the rearwardly projecting, axially extending, flange 30b of the drum element 30 are a set of clutch discs 41. Clutch discs 41 form a part of the direct drive and reverse drive clutch $C_2$. Discs 41 are arranged so as to be drivingly engaged with the clutch discs 48 by means that is subsequently described in detail.

Clutch discs 48 are drivingly mounted on the axially extending outer flange 43a of drum element 43. The centrally located hub portion of the drum element 43 is drivingly connected by splines 44 to the hollow shaft 45. Hollow shaft 45, which is journalled on the gear box shaft 26, has formed thereon a pair of axially spaced apart sun gears 51 and 61 respectively. Sun gear 51, which is an element of the forwardly located planetary gear set 50, is meshingly engaged with planetary pinion gears 52 (only one shown) that are rotatably mounted on the planet pinion carrier 53. Planet pinion carrier 53 has a peripheral rim 53a that is adapted to be engaged by the braking band $B_1$ when either two-way Low (1st) forward drive or Reverse drive is to be transmitted. Also drivingly connected to the planet pinion carrier 53 is a flanged collar 53b. Collar 53b has its hub portion journalled on the axially extending sleeve portion 42b' of the gear box housing central partition 42b. Fixed to the gear box housing partition 42b by the bolt means 46 is a roller type one-way brake device O.W.B. The one-way brake device O.W.B. is arranged to prevent reverse rotation (counterclockwise when looking from converter A towards gear box B) of the planet pinion carrier 53. The one-way brake O.W.B. provides the reaction for the compounded gear sets 50, 60 so as to provide a one-way Low (1st) speed drive as will be apparent from the subsequent description. The planet pinion gears 52 meshingly engage with the ring gear 54. Ring gear 54 is drivingly connected to a drum element 56 that in turn is drivingly connected to the radially extending flange 81a of the gear box output shaft 81. The ring gear 54 and the connected elements 56, 81a thus provide the means for transmitting torque from the planetary gear set 50 to the output shaft 81.

The sun gear 61, on the rear end of hollow shaft 45, meshingly engages the planet pinion gears 62 (only one shown) that are rotatably mounted on the pinion gear carrier 63. Planet pinion gear carrier 63 is drivingly mounted on the drum element 56 that is fixedly connected to the gear box output shaft 81. Planet pinion gear carrier 63 and the connected elements 56, 81a thus provide the means for transmitting torque from the planetary gear set 60 to the output shaft 81. The planetary gear set 60 can be activated to transmit a two-way kickdown (2nd) speed drive by the engagement of the braking band $B_2$ with the flange portion 43a of the drum element 43. Braking of drum 43 will anchor the sun gears 51 and 61 and then sun gear 61 will provide the reaction for the kickdown (2nd) speed forward drive transmitted through the gear set 60 from ring gear 64 to planet pinions 62 to the driven pinion gear carrier 63 carried by the output shaft 81.

As aforementioned, the direct drive and Reverse drive clutch $C_2$ comprises the clutch discs 41 and 48. Clutch discs 41 and 48 are mounted within the drum element 43 that provides a cylinder bore 67 for the clutch actuating piston 68. Application of pressurized fluid to the cylinder bore 67 causes forward movement of the piston 68 to a clutch engaging position. On forward movement of the piston 68 the discs 41, 48 are compressed between the piston 68 and the backing plate 69 that is anchored to the flange 43a of the drum element 43. Pressurized fluid for causing engagement of the clutch $C_2$ is supplied to the cylinder bore 67 through the connected conduits 72. The control system for the several braking bands and clutches and other pressure fluid operated devices associated with this transmission is schematically shown in FIGS. 5–20 and is subsequently described. Whereas pressurized fluid is used to move the clutch piston 68 forwardly to a clutch engaging position, the compression spring 74 is provided to continuously exert a force on the piston 68 tending to move it rearwardly to a clutch disengaged position.

Mounted on the transmission output shaft 81, rearwardly of the pump 84, is an output shaft speed responsive governor 85. Governor 85 is of the hydraulic type that provides a source of pressurized fluid having a variable pressure that is substantially proportional to the speed of the output shaft 81. The construction of the governor mechanism 85 is shown in detail in U.S. Patent No. 2,697,363 to W. L. Sheppard dated December 21, 1954. Obviously other types of governors could be used to provide a vehicle speed responsive control for the control system of this transmission.

With the aforedescribed gear box when the transmission is set in Neutral, see FIG. 5, the hydraulic control system prevents the application of pressurized fluid to either of the clutches $C_1$ or $C_2$ or to either of the servos 58 and 68 that are used to apply the braking bands $B_1$ and $B_2$. When clutch $C_1$ is disengaged, the torque converter-driven, gear box input shaft 18 is disconnected from the gear box intermediate shaft 26 so there can be no input to the gearing 50, 60 from ring gear 64. When the clutch $C_2$ is disengaged there can be no drive input to either of the gear sets 50, 60 through the sun gears 51, 61 of the gear sets.

When the drive ratio selector pushbuttons (see FIG. 5) are set for the initiation of drive in the Drive ratio the forward drive clutch $C_1$ is automatically engaged and this transmits drive to the gear box intermediate shaft 26 that carries the planetary input gear 64. Neither of the braking bands $B_1$ or $B_2$ nor the clutch $C_2$ is engaged at this time. The one-way brake O.W.B. prevents reverse rotation of the carrier 53 at this time and this one-way brake device provides the reaction for the compounded gear sets 50 and 60 which cooperate to transmit the one-way Low speed forward drive to the gear box output shaft 81. This Low speed drive passes from the input shaft 18 to the transmission intermediate shaft 26 and then to the ring gear 64. Ring gear 64 acts on the planet pinion gears 63 and causes rotation of the sun gear 61 backwards because the load on the output shaft 81 tends to anchor the planet pinion carrier 63 against rotation. Rotation of sun gear 61 backwards rotates the shaft 45 and the sun gear 51 backwards. The sun gear 51 rotating backwards acts on the planet pinions 52 and tends to rotate the pinion gear carrier 53 backwards because of the output shaft load on the ring gear 54. Due to the one-way brake device O.W.B. the carrier 53 can not be rotated backwards and the pinion gears 52 are then active to drive the ring gear 54 and connected output shaft 81 forwardly. Due to the connection of both the carrier 63 and the ring gear 64 to the output shaft 81 and due to the anchoring of carrier 53 by brake O.W.B. at this time, part of the torque of the input shaft 26 is transmitted directly to the output shaft 81 by the planetary gear set 60 and the other part of the input shaft torque is delivered to the output shaft 81 through the compounded gear sets 50 and 60. The starting Low drive when the transmission is set for Drive, or any other forward drive ratio for that matter, passes through both of the gear sets 50 and 60 with the reaction normally provided by the one-way brake device O.W.B.

When Second speed is to be attained by an upshift from the starting Low, it is merely necessary to apply braking band $B_2$ while the forward drive clutch $C_1$ remains engaged. This anchors the rotatable shaft 45 that carriers the sun gears 51 and 61. With sun gear 61 anchored the planetary gear set 60 is activated to directly transmit a two-way forward Second speed drive from ring gear 64 to pinions 62 to the output shaft 81 by way of the carrier 63. Planetary gear set 50 is inactive at this time and its pinion gear carrier 53 is driven forwardly at a speed which causes it to lift off and to over-run the one-way brake device O.W.B. Braking band $B_1$ and clutch $C_2$ remain disengaged when the transmission is conditioned for Second speed forward drive. It will be noted that no braking band need be released on an upshift from Low to Second because the Second speed can lift off the one-way brake O.W.B. when band $B_2$ is applied to activate Second speed and likewise no braking band need be applied on an automatic downshift from Second to Low for the drive can drop down on to the one-way brake device O.W.B. as the band $B_2$ is released.

Third forward speed or direct drive is achieved by an upshift from Second that results from the engagement of the direct drive clutch $C_2$ at the release of band $B_2$. The forward drive clutch $C_1$ remains engaged when in Third forward speed while bands $B_1$ and $B_2$ are each released. Engagement of clutch $C_2$ while clutch $C_1$ is engaged connects the ring gear 64 and the sun gear 61 of the planetary gear set 60 and this locks up the gear set 60 for the transmission of a direct 1:1 forward drive. Locking up gear set 60 also locks up gear set 50 because of the interconnection between the several elements of these two gear sets.

Reverse drive is obtained by engaging the clutch $C_2$ and applying the brake band $B_2$ while the clutch $C_1$ is disengaged and the braking band $B_2$ is released. With clutch $C_1$ disengaged there is no drive input to the transmission intermediate shaft 26 or to the ring gear 64. Drive input is from the input shaft 18 through the clutch $C_2$ to the sun gear 51. As braking band $B_2$ is applied the carrier 53 is anchored and the output shaft mounted ring gear 54 is driven in a backwards or reverse direction by the gear set 50. Planetary 50 is thus effective to transmit the Reverse drive.

For a coasting low speed ratio, for use as a brake or for continuous low speed operation, the braking band $B_1$ can be applied at the same time that the one-way brake O.W.B. and the forward drive clutch $C_1$ are engaged. Depression of the Low pushbutton "L" will (see FIG. 9) produce an effective coast brake ratio in the transmission. The one-way brake O.W.B. cannot be relied on for a coast brake in Low speed because it would permit carrier 53 to overrun at certain vehicle speeds.

For a coasting Second speed ratio, for use as a coast brake, or for limiting the transmission to an automatic two-speed operation, or for effecting a downshift to Second speed drive from the Third speed or direct drive, the "2" pushbutton may be depressed. The actual effect on the various control system mechanisms will depend on the transmission condition of operation at the time the "2" pushbutton is depressed. The "2" pushbutton thus provides a means for readily overruling the automatic controls that normally control the transmission when the "D" or Drive pushbutton is deperssed (see FIG. 10). Actual operation of the control system when the different pushbuttons are depressed is explained in detail hereafter.

The control system (see FIG. 5) for this transmission includes the manually operable drive ratio selector means 111 which iin this instance is a pushbutton mechanism such as that shown in the co-pending application of H. E. Scharfenberg Serial No. 596,529, filed July 9, 1956. Control pushbuttons 111 are connected by suitable Bowden cable linkage 113 to a rotatably mounted transmission case control plate 308 that mechanically shifts drive ratio selector valve 170. Plate 308 has one arm 309 connected to the valve 170, another arm 311 is arranged to control the engine starter switch 114 so that the engine can be started only when the transmission is in Neutral, and another serrated portion 312 of the plate 308 is arranged to be engaged by a spring pressed detent 310 to anchor the control plate 308 in each of its selected positions. Valve 170 has five ratio positions which are represented in the drawings by the letters R, N, D and 1 and 2 respectively. These letters correspond to the Reverse, Neutral, Drive, Low and Second speed ratios which ratios are selectively obtainable by manaual depression of the various pushbuttons. The letter V, associated with the valve units 120, 140, 170, 185 and with the other valve units of this control system, denotes a vent or drain port for returning the control system pressure fluids to the supply sump 26'.

Pressure fluid from either of the supply pumps 25 or 84 is directed into the main supply conduits 190, 191. Conduit 191 is connected to the inlet port of the manually operable drive ratio selector valve 170. The pressure of the fluid in supply conduit 191 is controlled by the pressure regulator valve 185 and this controlled, substantially constant intensity, pump supplied, pressure fluid is denoted "line" pressure (usually 90 p.s.i. in forward drives) for purposes of the description hereafter. Check valve 183 is connected to each pump discharge conduit and this valve maintains a closed pressure fluid supply system on the discharge side of the pumps.

When the manual ratio control valve 170 is located in the Neutral position (see FIG. 5) certain valve lands of this plunger or spool-type valve element 170 close off the escape of pressurized "line" pressure fluid from valve 170 to the associated transmission drive control mechanisms and thus "line" pressure fluid cannot pass from supply conduit 191 through valve 170 to activate any of the forward or reverse drive ratios. However, it should be noted that when the manually controlled ratio selector valve 170 is placed in the Neutral position with the vehicle engine running, or when the vehicle is being pushed or towed so that one or the other of pumps 25 or 84 is operating, "line" pressure fluid from one or the other of pumps 25, 84 can still be directed into and through conduit 192 to the line pressure regulator valve unit 185 and through valve unit 185 to the conduit 193 that supplies pressure fluid to the converter A. Conduit 193 may contain a restriction 195 to control the rate of flow of the fluid directed into the converter A. Pressure fluid passing through converter A is passed on to the pressurized transmission lubrication system and back to the sump 26 by way of the discharge conduit 194.

Conduit 194 has associated therewith a control valve 197 that controls pressurization of the converter and prevents rotor wheel cavitation, frothing in the converter and/or "blowing" of the converter fluid into the sump 26 under abnormal conditions. Conduit 194 may be connected to a finned air or fluid circulating converter fluid cooling unit 196. The converter restriction 195 and the control valve 197 cooperate to control flow through and to maintain a pressure of approximately 30 to 60 p.s.i. in the converter at all times when the engine is operating or when the vehicle is in motion.

In either of the forward drive ratio positions D, 1 or 2 of the drive ratio selector valve 170, "line" pressure fluid from supply conduit 191 will always be directed through the ratio control valve unit 170 and into the "line" pressure supply conduits 119, 119c, 119a that connect the manual drive ratio selector valve unit 170 with the torque controlled or torque responsive throttle valve unit 120. Consequently a form of torque responsive pressure fluid control is always available to cooperate with the driven shaft speed responsive governor 85 to conjointly control automatic operation of this transmission unit in all forward drive ratios. "Line" pressure passed to conduit 119 whenever the ratio selector valve 170 is in either Drive or Low or Second ratio also fills conduit 119b and is passed into branch conduit 160 for transfer to the "apply" side chamber 358b of the accumulator 358. Conduit 119b is also connected to branch conduit 360 that supplies "line" pressure fluid to the forward cluch $C_1$. Thus whenever valve unit 170 is set for Drive or Low or Second speed the forward clutch $C_1$ is engaged and the torque converter turbine driven shaft 18 is drivingly connected through clutch $C_1$ to the planetary annulus gear 64.

The connection of the branch conduits 160, 360 to the "line" pressure supply conduit 119b, whenever a forward drive is to be transmitted, connects the forward clutch $C_1$ to the fluid filled (see FIG. 6) "apply" chamber 358b of the accumulator 358. Thus engagement of the forward clutch $C_1$ is always cushioned by the fluid that is resiliently contained in accumulator chamber 358b and its spring 358c. The torque responsive throttle valve unit 120 (see FIG. 5) has operably associated therewith a kickdown valve mechanism 230 that is hereinafter described. The torque responsive throttle valve 120 is operated by linkage 116, 117 connected to the throttle control or accelerator pedal 115 for the fuel control of the engine E that drives this power transmission unit AB. Throttle valve 120 is arranged to reciprocate in its valve bore and act as a pressure regulating valve to control "throttle" pressure. Valve 120 is connected to the engine carburetor accelerator pedal operated valve actuating linkage 116—117 through a compression spring 124. At closed or idle throttle position of the accelerator pedal 115, with the manual control valve 170 set for either of the forward drive ratios D or 1 or 2, the arrangement of the throttle valve 120 is such as to permit pressurized fluid to seep from the "line" pressure supply conduit 119a past valve 120 to the conduit 125 and then into branch conduits 125a—125e. The pressure of the fluid passing through valve 120 will usually be lower than the "line" pressure supplied thereto by conduit 119a due to the reducing valve action of valve 120. This reduced or compensated "line" pressure supplied to conduits 125, 125a—125e by valve 120 is denoted "throtle" pressure hereafter.

The "throttle" pressure admitted to the branch conduits 125c and 125d is directly applied to the 1—2 and 2—3 shift valve units 140 and 240 respectively. These valves are essentially identical, except for dimensions, and thus only valve unit 140 will be described in detail (see FIGS. 12 and 13). The "throttle" pressure in branch conduits 125c and 125d is applied at the right end of the valve bores in valve units 140, 240 (see FIGS. 12 and 13) to provide a form of engine torque control for the shift valve units 140, 240. It is thought to be obvious from FIGS. 12 and 13 that the "throttle" pressure admitted to bore chamber 145 from conduit 125c will apply a throttle responsive force to the right end of the 1—2 shift valve 147 which force will tend to shift the valve 147 towards the left end of valve unit 140.

In addition to the force of the "throttle" pressure acting on the right end of 1—2 shift valve 147 (see FIGS. 12 and 13), there is a spring generated force constantly applied to the right end of valve 147 that also tends to shift the valve 147 towards the left end of the valve unit 140. The spring generated force results from the mounting of the precompressed spring 149 in the right end of the valve body so that it acts to urge valve 147 leftward at all times.

At the left end of the 1—2 shift valve unit 140 is a chamber 148 that is connected by the conduit means 98b to the outlet from the "governor" pressure compensator valve unit 400. "Governor" pressure compensator valve 400 is connected to the outlet 98 from the hydraulic governor 85. Conduit 98b pressurizes the valve bore chamber 148 of valve unit 140 with a "compensated governor" pressure fluid in which the fluid pressure intensity is proportional to the speed of the transmission output shaft 81. The "compensated governor" pressure in conduit 98b is of greater intensity than the "governor" pressure in conduit 98. This variation in the governor pressure is used to separate the shift points of valve units 140, 240. It is thus thought to be apparent that a rightwardly directed force will act upon the left end valve 147 that is proportional to the speed of the vehicle and this "compensated governor" pressure generated force will tend to shift the valve 147 towards the right end of valve unit 140.

Thus it will be seen that the pressure differential between the "throttle" responsive pressure fluid and the spring 149 applied to the right end of valve 147 and the "compensated governor" pressure fluid applied to the left end of valve 147 effects reciprocating movement of the valve 147 within valve unit 140. A relatively low transmission output shaft speeds with an open throttle the force of the "throttle" pressure plus the force of spring 149 acting on the right end of valve 147 is greater than the force of the "compensated governor" pressure acting on the left end of the valve and the valve 147 is automatically positioned substantially as shown in FIGS. 6 and 12. As the output shaft speed increases a point is reached where the "compensated governor" pressure from conduit 98b exerts a rightwardly directed force on the left end of valve 147 that overcomes the leftwardly directed force of the "throttle" pressure and the force exerted by the spring 149 on the right end of valve 147 and then 1—2 shift valve 147 shifts towards the right to its upshifted position such as that shown in FIGS. 7 and 13. This differential pressure generated shift on the 1—2 shift valve 147 is utilized to alternately connect and disconnect the "line" pressure conduits 119d and 155 (see FIGS. 6, 7 and 12, 13) and thereby automatically control operation of the second speed or "kickdown" servo unit 58 that applies and releases the second speed brake band $B_2$. As previously mentioned when band $B_2$ is released the reaction for the planetary gear sets 50, 60 is provided by the one-way brake O.W.B. if automatic drive is being used. Application of band $B_2$ merely changes the reaction element for the planetaries 50, 60 and the reaction "lifts" off the one-way brake O.W.B. The one-way brake O.W.B. automatically picks up the planetary reaction on release of brake band $B_2$, if speeds dictate a downshift, without actuation of any pressure fluid operated control device. Accordingly, the 1—2 shift is considerably simplified because of the particular arrangement of the O.W.B. in the gear box. Conversely the 2—1 downshift is materially simplified because there is no need to apply a brake band to anchor the reaction member on a normal downshift to low or first speed drive.

The accumulator unit 358 is arranged such that it not only cushions engagement of the forward clutch $C_1$ on initiation of any forward drive but, in addition, accumulator 358 is arranged to also cushion engagement of the second speed or kickdown band $B_2$ when this band $B_2$ is applied to effect the upshift from first or low speed drive to second speed drive.

As previously mentioned, when the 1—2 shift valve 147 is upshifted (FIG. 7) it connects "line" pressure supply conduit 119d to the conduit 155. Conduit 155 is connected to the 3—1 relay valve unit 460 and it also has a branch conduit 155a that is connected to the shuttle valve 130 and to the throttle pressure compensator valve unit 430. The shuttle valve 130 is of the type and functions to smooth out speed ratio shifts as set forth in detail in U.S. Patent 2,740,304 issued to W. L. Sheppard dated April 3, 1956. Throttle pressure compensator valve unit 430 is a spring-loaded, spool-type valve that has "line" pressure applied to portions of it by the conduit 155a and "throttle" pressure applied to other portions of it by conduit 125b. A compensated "throttle" pressure, that is higher than the "throttle" pressure supplied to the valve unit 430, is discharged from the "throttle" pressure compensator valve unit discharge conduit 125f. This increased or compensated "throttle" pressure is transferred by conduit 125f to the "apply" chamber 58a of the second speed or kickdown servo 58 to effect application of band $B_2$. At the same time that compensated "throttle" pressure is applied to chamber 58a of servo 58, "line" pressure from conduit 155d is applied to "apply" chamber 58b of servo 58 to assist in the application of band $B_2$. Only compression spring 58c resists the pressure fluid application of band $B_2$.

It will be noted that when "line" pressure is applied through conduit 155d to chamber 58b of second speed servo unit 58, to effect engagement of band $B_2$, that branch conduit 155c also applies "line" pressure to the release chamber 358a of the compensator 358. "Line" pressure directed to chamber 358a of accumulator 358 acts, with the assistance of compressed spring 358c, to force "line" pressure out of chamber 358b and in the process the engagement of the second speed or "kickdown" band $B_2$ is cushioned so as to give an exceptionally smooth upshift from first to second speed.

Automatic, and alternate, operation of the direct drive clutch $C_2$ and the second speed or "kickdown" servo unit 58 will effect the shifts between second and third speeds. This shifting is accomplished by the reciprocatory shift of valve 247 of the 2—3 shift valve unit 240. It will be noted that "line" pressure, which is a relatively high, constant intensity, pump supplied, pressure fluid (90 p.s.i.) is conducted to the 2—3 shift control valve unit 240 by the conduit 119d. "Line" pressure is supplied to conduit 119d by the pumps 25 and/or 84 whenever the drive ratio selector valve 170 is set for any of the forward drive ratios D, 1 or 2 respectively. At relatively low output shaft speeds (see FIG. 6) with the drive ratio valve 170 set for Drive, the "throttle" pressure applied to the right end of 2—3 shift valve 247 will cause the valve 247 to be positioned (see FIG. 7) across the "line" pressure inlet port from conduit 119d to prevent the transfer of "line" pressure fluid from conduit 119d through the valve unit 240 and out into the conduit 165. Conduit 165 is directly connected to the left end of 3—1 relay valve unit 460 and it has a branch conduit 166 that is connected to the shuttle valve unit 130. When "line" pressure is applied to conduit 166 on upshift of the 2—3 valve unit 240, the "line" pressure is passed through the shuttle valve unit 130 and out into conduit 167 and its branch conduit 167a. "Line" pressure in branch conduit 167a is directed into the "apply" bore of the direct drive clutch $C_2$ and the "line" pressure in conduit 167 is applied to the "release" chamber 58d of the second speed servo 58. Thus, whenever the shift valve 247 is moved to the right to the position shown in FIG. 8, "line" pressure will be transferred from conduit 119d through valve unit 240 to conduits 165, 166 and 167, 167a whereupon direct drive clutch $C_2$ will be applied and brake band $B_2$ released so that a direct or third speed forward drive is then transmitted through the torque converted A and the locked up gear trains 50, 60 whereby a drive of almost a 1 to 1 ratio is transmitted to the output shaft 81. Automatic upshifts and downshifts between the several drive ratios heretofore described are accomplished by the hydraulically actuated, automatic, snap action shifting of the shift valves 147 and 247 as hereafter explained. In addition, driver controlled downshifts or kickdowns from the direct drive to the second speed and the starting underdrive ratio can be accomplished by driver depression of the accelerator pedal 115 to a predetermined open throttle position such that the kickdown valving 230, previously mentioned and subsequently described, is brought into operation to accomplish the kickdowns or downshifts.

*Sequence of operation*

*Neutral.*—So far we have described the construction and operation of individual units of the gear box and the hydraulic system. Now let's review the operation of the entire hydraulic system in sequence, and the consequent action of the transmission. With the "N" (Neutral) button pushed "in" (see (FIG. 5), as soon as the engine is started, the rotation of the torque converter A causes the front oil pump 25 to rotate and build up fluid pressure and flow. The pressure fluid from pump 25 is directed through conduit 189a to the regulator valve body 185, and through conduit 189 to the pump check valve 183. The pressure fluid will lift the "reed"-type check valve 183 off its seat, and fluid will flow through conduit 190 to the right end chamber of regulator valve body 185, and also through a conduit 191 to the "line" pressure inlet port of the manual valve 170. Since the manual valve 170 is in neutral position, no pressure is transmitted to the several hydraulic operating units 120, 140, 240, 58, 68, $C_1$, $C_2$, etc. at this time, and consequently no torque is transmitted to the vehicle drive wheels.

When the front pump pressure reaches 90 p.s.i., the pressure regulator valve moves leftward against its spring 186, so the middle land of the regulator valve starts to uncover the front pump "in" port to by-pass any excess pump pressure and flow back through conduit 123. The regulator valve 185 will move back and forth slightly, uncovering and cutting off the front pump "in" conduit 123. This will regulate the pump and "line" pressure at 90 p.s.i.

The rate of flow to the converter A is metered by an orifice 195 in the converter supply line 193. The fluid leaves the converter A and is returned to sump 26' by the conduit 194.

The converter "out" pressure of 30 p.s.i. acting against the converter control valve 197 moves the valve 197 to a position where it uncovers a port to supply lubrication to the transmission. After the lubrication flow requirements are satisfied, the converter "out" pressure can build up to 60 p.s.i. This will move the valve 197 out farther to discharge the excess flow from the converter into the transmission sump. The converter pressure is regulated at 30 to 60 p.s.i.

On water-cooled transmissions the lubricating oil is routed through an oil cooler 196 located at the water pump inlet on the engine. From the oil cooler lines the oil flows through passages in the transmission case to the input and output shafts. The lubricating oil pressure escapes through metering holes in the intermediate shaft 26 and sun gear shaft 45 to lubricate the moving parts of the transmission. On air-cooled transmissions the lubricating oil is routed from the converter outlet 194 through a by-pass tube (not shown) and a passage in the transmission case to the input and output shafts.

To assist in following the pressure fluid flow under various conditions, the diagrammatic views (FIGS. 5–17) have had arrows applied to the several conduits thereof that are pressurized when the transmission controls are conditioned as indicated. All conduits that are not arrowed are vented under the condition indicated on the particular view.

*Drive ("D") Breakaway.*—When the "D" (Drive) button is pushed "in" (see FIG. 6), the manual valve 170 is moved leftward connecting the conduits 190, 191, and "line" pressure is admitted to the front clutch $C_1$ and to top of the accumulator piston 359. The engagement of the front clutch is cushioned by acumulator piston moving down, compressing the spring 358c.

"Line" pressure is also transmitted to the throttle valve 120, governor compensator valve unit 400, both shift valve units 140, 240, and to the governor 85. There is no further transmission of "line" pressures by these valves, because the "line" pressure ports of all valves are blocked by valve lands. However, the throttle valve 120 calibrates a pressure in accordance with throttle opening, and transmits this pressure to the throttle compensator valve unit 430, shuttle valve 130, and the spring loaded side of both shift valve unit 140, 240 and the 3—1 relay valve unit 460.

*Breakaway operation.*—The power flow is from the converter turbine 15 through the input shaft 18 and front clutch $C_1$. Since the front clutch $C_1$ is engaged, the power is transmitted through the front clutch $C_1$ and intermediate shaft 26 to the kickdown annulus gear 64. The annulus gear drives the kickdown planet pinions 62, rotating them in the same direction. The planet pinions 63 being meshed with the rear sun gear 61 rotate it in the opposite direction. The two sun gears 61, 51, being integral, rotate in the same direction, hence the reverse sun gear 51 will also rotate in the reverse direction. The reverse sun gear 51 rotates the reverse planet pinions 52 in the forward direction, driving the reverse annulus gear 54 in the forward direction. The reverse planet carrier 53 is prevented from rotating backwards, since it is mounted on the overrunning brake O.W.B., which becomes stationary during "breakaway." The reverse annulus gear 54 and the kickdown planet carrier 63, being splined to the output shaft drive housing 56, rotate the output shaft 81 in the forward direction. Because of the differential of both planetary gear sets 50, 60 the input shaft to output shaft ratio is 2.45 to 1, hence the torque output through the transmission is multiplied 2.45 times.

*Upshift to Second.*—At a vehicle speed of 10 to 40 m.p.h. the governor 85 provides a "governor" pressure of a value such that when the governor compensator valve 400 increases it, the "compensated governor" pressure in conduit 98b acting against the 1—2 shift valve governor plug 146, is great enough to overcome the spring load and "throttle" pressure applied against the right end of 1—2 shift valve 147 and the "compensated governor" pressure moves the valve 147 to the "upshift" position (see FIGS. 7–13).

In this position (FIG. 7) the 1—2 shift valve 147 connects and directs "line" pressure through conduit 155 to the 3—1 relay valve unit 460, the shuttle valve unit 130, the throttle pressure compensator valve unit 430, and into conduit 155b, thence through the kickdown servo bleed restriction 100 and metered restriction 200 to the "line" pressure apply area 58b of the kickdown servo piston 59. The "line" pressure from conduit 155b is also directed to the chamber 358a below the accumulator piston 359, forcing the piston up. The action of the accumulator at this time cushions the engagement of second speed band $B_2$.

At higher car speeds, the "throttle" pressure in conduit 125g against the right end of the shuttle valve 131, and "governor" pressure in conduit 98c against the left end of the shuttle valve 131 has moved the valve 131 to cut off the "line" pressure supply in conduit 155g. Therefore, the "line" pressure to the kickdown servo 58 must flow through the servo bleed restriction 100 and this gives a slower and smoother engagement of the band $B_2$ for high speed kickdowns.

The throttle compensator valve unit 430 produces a pressure greater than "throttle" pressure in accordance with throttle opening and this compensated "throttle" pressure is transmitted by a conduit 125f to the small diameter upper area 58a of the kickdown servo unit 58. The force of kickdown servo application is controlled by this compensated "throttle" pressure in chamber 58a, when the kickdown band B₂ develops sufficient capacity to stop and hold the rear clutch retainer 43 and the attached sun gears 51, 61, the overrunning O.W.B. starts to over-run so the release of the reverse planet carrier 53 is automatic. The drive then is in "second gear."

*Drive ("D") second operation.*—The power flow is from the converter turbine 15 through the input shaft 18 and front clutch C₁. The front clutch C₁, being engaged, transmits power through the intermediate shaft 26 to the kickdown annulus gear 64. The annulus gear 64 causes the planet pinions 63 to rotate in the same direction.

Since the kickdown band B₂ is applied, the sun gear 61 cannot rotate, hence the planet pinions 62 will "walk" around the sun gear 61, forcing the planet carrier 63 in the same direction. The kickdown planet carrier 63, being splined to the output shaft drive housing 56, rotates the output shaft 81 in the same direction. The input shaft to output shaft ratio is 1.45 to 1. Hence, the torque output through the transmission is multiplied 1.45 times.

*Upshift to direct.*—At a speed of 15 to 75 m.p.h., depending on the throttle valve opening, the "governor" pressure in conduit 98 acting against the left end of the 2–3 shift valve 247, is great enough to overcome the spring load and "throttle" pressure acting against the right end of valve 247 and this moves the 2–3 shift valve 247 to the "upshift" position (see FIG. 8). In this position the 2–3 shift valve connects and directs "line" pressure from conduit 119d into conduit 165 for application to the reaction area 245 at the left end of the 3–1 relay valve 461. Branch conduits 166, 167 direct "line" pressure through the shuttle valve unit 130 to the rear clutch C₂ and to the "release" area 58d of the kickdown servo 58 simultaneously.

During normal power upshifts, at greater throttle opening, the shuttle valve 131 is shifted leftward and it connects conduits 166, 167 so that "line" pressure is directly applied to rear clutch C₂ and to the "release" side 58b of the kickdown servo 58, by-passing the metered restriction 300. Hence, the engagement of clutch C₂ is rapid, and the transmission is in direct drive as soon as kickdown servo unit 58 is released, by the force of "line" pressure in chamber 58d and the piston return spring 58c against the "release" side of the piston 59.

However, during a "lift foot" upshift, the "throttle" pressure against the right end of shuttle valve 131 drops. "Governor" pressure against the left end of shuttle valve 131 is sufficient to overcome the force of "throttle" pressure against the valve 131, and "governor" pressure moves the shuttle valve 131 to its extreme rightward position. In this position the valve 131 has cut off the unrestricted flow of "line" pressure from conduit 166 through shuttle valve 130 to the conduit 167. Hence, the "line" pressure to engage the rear clutch C₂ and release the kickdown servo 58 must flow through metered restriction 300. This provides a smooth, relatively slow, "lift foot" upshift.

*Drive ("D") direct.*—In direct drive both clutches C₁ and C₂ are engaged and locked together, since the front clutch retainer 30a and the rear clutch hub 30b are integral. Since the kickdown annulus gear 64 is connected to the front clutch C₁ through the intermediate shaft 26, and the sun gear 61 is connected to the rear clutch C₂, the kickdown planetary unit 60 in effect is locked up, and the entire planetary system 50, 60 rotates as a unit. The power flow is from the converter turbine 15 through the input shaft 18 and both clutches C₁, C₂, through the intermediate shaft 26 and the sun gear 61, to the kickdown planetary set 60. The kickdown planet carrier 63, being splined to the output shaft drive housing 56, rotates the output shaft 81 in the same direction. The input shaft to output shaft ratio is 1 to 1. Hence, there is no increase in torque or speed. The only torque multiplication in direct drive is that of the torque converter A.

When the upshift is made from second to direct, at less than ⅝ throttle opening, the force of the "line" pressure in conduit 165 from the 2–3 shift valve unit 240 acting on the reaction area of the 3–1 relay valve unit 460 is great enough to overcome the combined force of the spring 462 and the "throttle" pressure applied against the right end of relay valve 461. This moves the 3–1 relay valve 461 to the right end of the valve housing and in this position the 3–1 relay valve 461 connects and directs "line" pressure from the 1–2 shift valve to the "interlock" reaction area 245 of the 2–3 shift valve (see FIGS. 12–16). This application of "line" pressure to the interlock reaction area of the 2–3 shift valve unit 240 facilitates the third speed to first speed downshift.

*Downshift.*—You will notice that (see FIGS. 14–16) the small diameter of the 2–3 shift valve governor plug 246 has a clearance of approximately .015 inch, and the inner end is spherical to admit "line" pressure to the interlock reaction area 245 of the 2–3 shift valve unit 240. The force of "line" pressure against the interlock reaction area 245 will keep the 2–3 shift valve 247 in the upshift position, until the 1–2 shift valve 147 has moved to the left to its downshift position, cutting off conduit 155 that directs the "line" pressure to the 3–1 relay valve unit 460 and to the 2–3 shift valve interlock reaction area 245. This will permit the 2–3 shift valve spring 249 to move the valve 247 to the left to its downshift position simultaneously with the downshift of the 1–2 shift valve 147. At the same time the 2–3 shift valve 247 cuts off the "line" pressure supply to the 3–1 relay valve reaction area 465. Hence, the 3–1 relay valve spring 469 will move the valve 461 to the "off" position at the left end of valve unit 460.

Thus, for all normal stops in city traffic the transmission will downshift at closed or nearly closed throttle from direct (3rd) to breakaway (1st) at approximately 8 m.p.h. However, at more than one-half throttle opening, the combined force of "throttle" pressure and spring load against the right end of the 3–1 relay valve 461 is great enough to overcome the force of "line" pressure against the valve reaction area 465, hence the 3–1 relay valve moves to its leftward to the "off" position. This cuts off the "line" pressure supply to the interlock reaction area 245 of the 2–3 shift valve unit 240. Under these conditions a normal power downshift from "direct to second" would occur at approximately 12 m.p.h. and a subsequent downshift from "second to breakaway" at approximately 8 m.p.h.

*Kickdown.*—When kickdown is desired (see FIG. 17) the accelerator pedal 115 is depressed so the transmission throttle valve pivot lever 117 contacts a kickdown detent. Further depression of the accelerator pedal picks up the additional load of the kickdown detent, so it can be felt in the accelerator pedal 115, and moves the kickdown valve 230 further to the right (see FIGS. 18–20). The kickdown valve inner stem contacts the throttle valve 120 and mechanically pushes it rightward to a point where the throttle valve 120 uncovers the "line" pressure port from conduit 119a. The valve 120 now connects the "line" pressure conduit 119a to the "throttle" pressure conduit 125. Hence, "throttle" pressure now increases and becomes the same value as "line" pressure (90 p.s.i.). At this time the kickdown valve 230 has connected the "throttle" pressure conduit 125 to the kickdown pressure supply conduit 235. Kickdown pressure, now at "line" pressure value, is directed through the kickdown pressure supply conduits 235, 236 and 237 to the kickdown plugs 141, 241 of both the 1—2 and 2—3 shift valves. You will notice that ball check valves 142, 242, 342 n the kickdown pressure supply conduits have closed off the vents to the kickdown passages.

If the vehicle speed is between 25 and 70 m.p.h. the kickdown will occur "direct to second." Since at speeds of 25 m.p.h. and over, the force of the "compensated governor" pressure acting against the governor plug 146 of the 1—2 shift valve unit 140 is greater than kickdown "line" pressure acting against the kickdown plug 141, hence the 1—2 shift valve 147 remains in the upshift position. The force of "kickdown" pressure acting against the kickdown plug 241 of the 2—3 shift valve unit 240 is sufficient to overcome the force of "governor" pressure acting against the governor plug 246 and kickdown pressure moves the 2—3 shift valve 247 to the left to its downshift position.

During all kickdown operation the shuttle valve 131 has "line" pressure applied to its right end and it is forced leftward. This will permit the movement of the shuttle valve 131 to its left and "intermediate" positions. At vehicle speeds below 30 m.p.h. the force of "governor" pressure against the left end of the shuttle valve 131 is not great enough to overcome the combined force of valve spring pressure and maximum servo pressure that urge the valve leftward. Hence, the valve 131 is held in its left position. The valve 131 now permits the "line" pressure in conduit 155a to by-pass the servo bleed restriction 100 and flow through conduit 155b to servo unit 58. The rate of servo application is at its maximum, since kickdown at lower vehicle speeds requires very little time to complete the downshift.

Protection against engine runaway at low speed kickdown is provided by restriction 300 in the rear clutch "line" pressure supply conduit 166. At low-speed kickdown the by-pass restriction 300 is cut off, and the discharge of the kickdown release pressure is "backed up" to the rear clutch $C_2$ to momentarily delay the disengagement of the clutch until the kickdown servo unit 58 has fully applied the band $B_2$.

At vehicle speeds above 30 m.p.h. the force of "governor" pressure in conduit 98c acting against the shuttle valve 131 is great enough to overcome the spring pressure applied to the shuttle valve and the "governor" pressure moves the shuttle valve 131 to the "intermediate" position. In this position the shuttle valve 131 has cut off the by-pass 155g of "line" pressure around the servo bleed valve 100. "Line" pressure to the apply pressure area 58b of the kickdown servo 58 must flow through the hole in the servo bleed valve 100 and restriction 200. The shuttle valve 131 in the "intermediate" position permits the pressure on the release side 58d of the kickdown servo piston 59 and rear clutch $C_2$ pressure to bleed off rapidly and vent through the 2—3 shift valve 240, by-passing restriction 300 in the pressure passage. Hence, kickdown servo application is rapid. The quality of the kickdown is obtained by balancing the flow of the "apply and release" pressures of the kickdown servo. The power flow in kickdown is the same as in "second" after upshift from breakaway.

At vehicle speeds below 25 m.p.h., the kickdown occurs from "direct to breakaway." The force of kickdown pressure acting against the 1—2 shift valve kickdown plug 141 is great enough to overcome the force of "compensated governor" pressure acting against the governor plug 146 and it moves the 1—2 shift valve 147 to the left to the downshift position. The 2—3 shift valve 247 has cut off "line" pressure from the rear clutch $C_2$, and the 1—2 shift valve has cut off the "line" pressure from the 2—3 shift valve unit 240, the throttle compensator valve 430 and the kickdown servo 58. Thus, as soon as the rear clutch $C_2$ is released, the reverse planet carrier over-running brake O.W.B. picks up the reaction load and locks the planet carrier 53 against reverse rotation. The power flow in "direct to breakaway" kickdown (3—1) is the same as in "breakaway" operation.

*Second ("2") Breakaway.*—When the "2" (second) button is pushed "in" (see FIG. 10) the manual valve 170 is moved farther to the left, uncovering another conduit 219 in addition to those uncovered when the valve was in drive ("D") position. In addition to those conduits and valves receiving "line" pressure when the manual valve was in drive ("D") position, "line" pressure is now connected by the manual valve 170 to conduits 219, 237 and directed to the 2—3 shift valve kickdown plug 241, and to the right end of the shuttle valve 131. You will note that one ball check valve 242 has cut off this "line" pressure from the kickdown valve 230, and another ball check valve 342 has cut off the "throttle" pressure from the right end of the shuttle valve 131 and admitted "line" pressure instead.

When the vehicle is not in motion the 1—2 shift valve 147 is in the "downshift" position, and no pressure is directed to the apply side of the kickdown servo 58. Hence, when starting the vehicle in motion with the "2" (Second) button pushed in, the vehicle starts in breakaway the same as in drive ("D") breakaway, and the power flow is the same.

*Upshift to Second.*—At a vehicle speed of approximately 10 to 40 m.p.h., depending on throttle opening, the "compensated governor" pressure acting against the 1—2 shift valve governor plug 146 is sufficient to overcome the combined force of the spring load and "throttle" pressure applied against the right end of 1—2 shift valve 147 and the "compensated governor" pressure moves the valve 147 to the upshift position.

In this position the 1—2 shift valve unit 140 connects and directs "line" pressure to the 2—3 shift valve unit 240, the 3—1 relay valve 460, the shuttle valve 130, the throttle compensator valve unit 430 and the apply side 58b of the kickdown servo 58. During the upshift at speeds below 30 m.p.h. the shuttle valve is in the extreme left position and the flow of "line" pressure to the apply side 58b of the kickdown servo 58 by-passes the servo bleed valve restriction 100. At speeds above 30 m.p.h. the force of "governor" pressure acting against the left end of the shuttle valve 131 is great enough to overcome the force of the valve spring and moves the shuttle valve to its "intermediate" position. In this position the kickdown servo apply "line" pressure in conduit 155a must flow through restriction 100. Hence, the rate of kickdown servo application is retarded, and is regulated by throttle position through the effect of the force of "compensated throttle" pressure on the small diameter at the top of the kickdown servo piston 59.

With the "2" (Second) button pushed "in," the transmission will operate between "breakaway and second" speed with the normal downshift to breakaway at approximately 8 m.p.h., and "kickdown to breakaway available up to 25 m.p.h. However, should the vehicle be operated in second speed at speeds in excess of 75 m.p.h. the "governor" pressure applied to the left end of the 2—3 shift valve 247 will overcome the forces applied to the right end of valve 247 by the spring and "line" pressure and the transmission will automatically upshift to direct drive. This is a safety arrangement to prevent over-speeding the engine in second speed.

While "line" pressure is directed to the 2—3 shift valve kickdown plug 241, when the "2" (Second) button is pushed "in," the force of "governor" pressure speeds above 75 m.p.h. acting against the governor plug 246 is sufficient to overcome the force of "line" pressure against the kickdown plug 241, and the 2—3 shift valve 247 moves to the right to the upshift position. The engagement of the rear clutch $C_2$ and release of the kickdown band $B_2$ is the same as the upshift to direct when the "D" (Drive) button is pushed in.

When the vehicle speed drops below 70 m.p.h. the force of "line" pressure on the kickdown plug 241 overcomes the force of "governor" pressure on the governor plug 246 and the 2—3 shift valve 247 will move leftward to the downshift position. The rear clutch $C_2$ will disengage and the kickdown band $B_2$ will apply simultaneously.

*Low ("1") operation.*—When the "1" (Low) button is pushed "in" (see FIG. 9), the manual valve 170 is moved out to the extreme left. In this position the valve 170 uncovers another conduit 319 in addition to those uncovered for drive ("D") and second ("2") operation. This conduit 319 directs "line" pressure to a reaction area 143 on the right end of the 1—2 shift valve governor plug 146 and by means of branch conduit 319a to the 1—2 shift valve kickdown plug 141. You will note that the ball check valve 242 closes the conduit 235 to the kickdown valve 230. "Line" pressure is also directed to the low and reverse servo 68 at this time by way of conduit 320. You will notice that a ball check valve 442 has closed the vent passage to the manual valve bore by way of conduits 321a, 321. "Line" pressure against the low and reverse servo piston 69 causes the servo 68 to apply the low and reverse band $B_1$ holding the reverse planet carrier 53.

The power flow is the same as that in "breakaway," except that the low and reverse band is holding the reverse planet carrier in addition to the overrunning brake O.W.B. This provides a two-way drive for coast braking.

Hence, we have "line" pressure against the right side of the 1—2 shift valve governor plug 146 and against the kickdown plug 141, and "compensated governor" pressure against the left side of the 1—2 shift valve governor plug 146. The difference of the areas against which the pressures act prevents any movement of the 1—2 shift valve 147 and consequently no upshift regardless of vehicle speed. Hence, it is desirable to use the "1" (Low) pushbutton position when ascending or descending steep grades. Since the low and reverse band $B_1$ holds the reverse planet carrier, the engine may be effectively used to brake the vehicle movement.

*Reverse ("R") operation.*—When the "R" (Reverse) button is pushed "in" (see FIG. 11) the manual valve 170 is moved to the extreme "in" position. However, if the vehicle forward speed is in excess of 10 m.p.h. when the "R" (Reverse) button is pushed in, the blocker valve 480 will stop the manual valve in "neutral" position. See the co-pending application of Leonard E. Froslie, Serial No. 542,125 filed October 24, 1955, now U.S. Patent 2,924,124.

In the reverse position the manual valve 170 directs "line" pressure, which the regulator valve 185 has raised to 225 p.s.i., to the rear clutch $C_2$ and to the low and reverse servo 68. The manual valve 170 has cut off the "line" pressure to any forward driving valves or control units. "Line" pressure has been cut off from the conduit 192 that is connected to the regulator valve "secondary" reaction area 185a, hence it requires 225 p.s.i. on the "primary" reaction area 185b to operate the regulator valve 185. The flow through the converter A is the same as in forward driving, with the converter control valve 197 regulating the converter pressure. You will note that the ball check valve 542 in the rear clutch "line" pressure supply conduit 167a has seated and cut off the pressure flow from the release side of the kickdown servo unit 58 by way of conduit 167. Also the ball check valve 442 in the low and reverse servo "line" pressure supply 320 has seated and cut off the pressure from going back through conduit 320 to get behind the 1—2 shift valve governor plug 146.

The power flow in reverse is from the converter A through the input shaft 18 and the rear clutch $C_2$. Since the rear clutch $C_2$ is now engaged, the power flow is through the rear clutch $C_2$ and sun gear 51. The sun gear 51 rotates the reverse planet pinions 52 in the reverse direction. Since the reverse planet carrier 53 is being held by the action of the low and reverse servo band $B_2$, the planet pinions 52 act as idlers and drive the reverse annulus gear 54 in the reverse direction. The reverse annulus gear 54, being splined to the output shaft drive housing 56, rotates the output shaft 81 in the reverse direction. The input shaft to output shaft ratio is 2.20 to 1.

One of the most important features of the transmission control system herein disclosed (see FIGS. 14–16) relates to the arrangement whereby during normal automatic operation, with the Drive pushbutton (D) depressed, means are provided for effecting progressive upshifts from Breakaway or first speed to second speed and thereafter to third speed or direct drive but wherein the normal automatic downshift is from third speed directly to the Breakaway or first speed drive. This arrangement eliminates the third speed to second speed downshift, at closed or light throttle operation, and therefore a possible source of body lurch, downshift clunk, overspeed noise, or any of the other troubles frequently associated with speed ratio changes in current automatic transmissions are remedied. In addition to normally eliminating the 3—2 downshift and its attendant troubles, this transmission and its controls provide an improved form of 3 to 1 downshift because of the one-way brake device O.W.B. that automatically energizes the first speed planetary gearing when direct drive clutch $C_2$ is released to accomplish the 3—1 downshift. It is recognized that one-way clutches and/or brakes have been used before for assisting speed ratio changing but it is not thought that the specific arrangement herein disclosed and claimed has been previously disclosed to the public. As previously pointed out (see FIGS. 14–16) the upshift of the 2—3 shift valve 247 pressurizes conduit 165 with "line" pressure that is applied to the reaction area 465 at the left end of the 3—1 relay valve 461. "Line" pressure in area 465 of the 3—1 relay valve will shift the 3—1 valve 461 to the right and this will permit "line" pressure in conduit 155 to pass through valve unit 460 and into conduit 199 which applies "line" pressure to the interlock reaction area 245 of the 2—3 shift valve unit 240. The force of "line" pressure in the interlock reaction area 245 combines with the "governor" pressure applied to the left end of the 2—3 shift valve governor plug 246 to normally lock the 2—3 shift valve 247 in its upshifted position until after the 1—2 shift valve 147 downshifts to its low speed or Breakaway position. When the 1—2 shift valve 147 downshifts (see FIG. 16) the "line" pressure in conduit 155 that had been passed through 3—1 relay valve unit 460 to the interlock reaction area 245 of 2—3 shift valve 247 is now vented and the 2—3 shift valve 247 will downshift at the same time the 1—2 shift valve 147 is downshifting. At the same time that 2—3 valve 247 downshifts the "line" pressure is cut off from conduit 165 and thus the "line" pressure supply to the 3—1 relay valve reaction area 465 is then vented. This permits the "throttle" pressure and spring force applied to the right end of the 3—1 relay valve 461 to shift the valve 461 to the left to its downshifted position where it is conditioned for subsequent upshift operation of the shift valves 147, 247.

As previously pointed out, all normal light throttle or closed throttle stops of the vehicle will cause the aforedescribed automatic downshift from third speed directly to first speed. However, if the vehicle throttle valve 120 is open one-half or more then the "throttle" pressure force and the spring force applied to the right end of the 3—1 relay valve 461 is great enough to overcome the force of the "line" pressure being applied against the relay valve reaction area 465 and the 3—1 relay valve 461 will downshift to the left and cut off the "line" pressure supply in conduit 199 that has been applied to the interlock reaction area 245 of the 2—3 shift valve. Accordingly there will be an immediate downshift from third speed to second speed at about 12 m.p.h. vehicle speed during open throttle operation, and subsequently when the vehicle speed drops to about 8 m.p.h. there will be a second downshift from the second speed to the Breakaway or first speed.

The 1—2 shift valve unit 140, which is substantially identical to the 2—3 shift valve unit 240, is shown in detail in its downshifted position in FIG. 12 and in its upshifted position in FIG. 13. A brief explanation of FIGS. 12 and 13 may bring out certain advantages of this type of shift valve that may not have been readily apparent from the foregoing description. The valve unit 140 is essentially a valve body having axially aligned connected bores that receive the three separate, relatively movable, valve parts, namely the kickdown plug 141, the governor plug 146 and the shift valve 147. A compression spring 149 interconnects the right end of the shift valve 147 and the kickdown plug 141. In the downshifted position shown in FIG. 12, "compensated governor" pressure from conduit 98b is applied to the left end of the governor plug 146. This "compensated governor" pressure tends to urge the several interconnected valves 146, 147, 141 towards the right and causes additional compression of the spring 149. At the same time that "compensated governor" pressure is applied to the left end of the governor plug 146, "throttle" pressure from conduit 125c is applied to the area 145 between the right end of the shift valve 147 and the left end of the kickdown plug 141. At this time the force of spring 149 and the "throttle" pressure in area 145 tend to urge the shift valve 147 to the left while the "compensated governor" pressure applied at the left end of valve 147 is tending to urge the shift valve 147 to the right from its downshifted FIG. 12 position to its upshifted position shown in FIG. 13. As long as the resultant of the applied spring force and the "throttle" pressure force is sufficient to prevent the "compensated governor" pressure force from materially shifting the valve 147 towards the right, the valve 147 will remain in its FIG. 12 downshifted position and "line" pressure from conduit 119d cannot enter the bore of valve unit 140 to effect the upshift to the FIG. 13 position.

However, after the "compensated governor" pressure at the left end of valve 146 increases to such a value that it initiates rightward movement of the valve 147, then when "line" pressure begins to enter the area 144 (see FIG. 13) of valve unit 140 there is an additional "snap-over" force developed in the reaction area portion 144 of the valve unit 140 and the valve 147 is snapped over rightward to its upshifted position (see FIG. 13). Hunting of valve 147 is prevented by this snap-over action. It will be noted also that in the upshifted position, the shift valve 147 closes off the supply of "throttle" pressure from conduit 125c to the bore area 145 of valve unit 140. Accordingly, after upshift of the shift valves 147, or 247, the valves are not sensitive to variation in "throttle" pressure and therefore hunting of the shift valves between upshifted (FIG. 13) and downshifted (FIG. 12) positions is eliminated. Downshift is normally controlled by the reduction in vehicle speed to such a value that the spring force applied to the right end of the shift valve 147, or 247, overcomes the governor and/or "compensated governor" pressures applied to the left ends of the shift valves, as well as the "line" pressure generated forces in the reaction areas 144 or 244, and then the shift valves are snapped leftward to their downshifted positions (see FIGS. 6, 12 and 16).

FIGS. 18–20 show the combination kickdown valve and throttle pressure control valve unit. This unit comprises a casing 220 having a bore extending longitudinally thereof that receives the axially shiftable throttle valve 120 and kickdown valve 230. Valves 120 and 230 are interconnected by a compression spring 221 so that leftward movement of the kickdown valve 230 will cause a leftward shift of the throttle valve 120. Extending concentrically about a portion of the stem 231 of kickdown valve 230 is a sleeve piston 223. A stop 224 retains the sleeve piston 223 within the bore in casing 220. The pivotally mounted lever plate 117, that is rotated by depression of the accelerator pedal 115, has a bent end finger portion 117a that is arranged to sequentially engage the stem 231 of the kickdown valve 230 and thereafter the sleeve piston 223 if the accelerator should be depressed sufficiently to cause a kickdown.

It is preferred that the kickdown be accomplished during but not until the last five or ten degrees of throttle valve opening movement. Such an arrangement has the least detrimental effect on engine torque usable for direct drive.

Operation of the combination kickdown and throttle pressure control valve is thought to be more or less obvious from a consideration of FIGS. 18 through 20. As the accelerator pedal 115 is depressed, the lever plate 117 will be rotated counterclockwise and the finger portion 117a of plate 117 will urge the kickdown valve 230 towards the right. Movement of the kickdown valve 230 towards the right will be transmitted to the throttle pressure control valve 120 by means of the compression spring 221. As throttle valve 120 moves rightward from its position in FIG. 18 "line" pressure in conduit 119a will be bled into the chamber 226 and transferred to the conduit 125 and its several branch conduits. The pressure fluid in chamber 226 is normally less than the "line" pressure because of the pressure regulating action of the throttle valve 120. It will be noted that "throttle" pressure directed into conduit 125 is applied to the reaction area 227 at the right end of throttle valve 120 and this same "throttle" pressure is also directed into the chamber 228 at the left end of valve body 220 between the sleeve piston 223 and the land portion 232 of kickdown valve 230. During normal movement of the accelerator operated throttle control 117a between its closed throttle position K and its substantially wide open position M the finger portion 117a of the lever plate 117 engages only the stem portion 231 of the kickdown valve 230. During this throttle opening movement through the arc K, M the force opposing movement of the kickdown valve 230 is relatively light because it represents merely the "throttle" pressure applied to a relatively small portion of the right end of throttle valve 120. It will be noted that the "throttle" pressure in the chamber portion 228 opposes the "throttle" pressure applied to the right end of throttle valve 120 and thus the force urging the kickdown valve 230 leftwardly is the force resulting from the "throttle" pressure against the differential areas of chamber 228 and the area of the right end of throttle valve 120. However, when the finger 117a of lever plate 117 reaches point M of its throttle valve opening arc of movement, the sleeve piston 223 is then picked up and moved rightwardly at the same time that the kickdown valve 230 is being moved rightwardly. At the moment that sleeve piston 223 is picked up for movement by the finger 117a of lever plate 117 the force urging the kickdown valve 230 leftwardly is materially increased for now the lever plate finger 117a must overcome the leftwardly directed force of the "throttle" pressure against the full area of the right end of throttle valve 120. Furthermore, at the time that lever finger 117a initiates rightward movement of sleeve piston 223, the throttle valve 120 has been moved rightward to such a degree that "line" pressure conduit 119a now flows directly into chamber 226 and thus the "throttle" pressure is substantially equal to the line pressure (90 p.s.i.) and thus the force on the right end of throttle valve 120 caused by the "throttle" pressure in chamber 227, is at its maximum. This same maximum "throttle" pressure is being directed into the chamber 228 at the left end of the casing 220 and at this time the land 232 of kickdown valve 230 has been moved rightwardly to such a degree that the chamber 228 is now connected to the conduit 235 (see FIG. 19) so that "throttle" pressure (substantially 90 p.s.i.) will be directed to the kickdown areas at the right ends of each of the shift valve units 140 and 240.

It is thought that the foregoing description of FIGS. 18 through 20 explains the kickdown operation in the disclosed transmission control system. Furthermore, the specific arrangement shown in FIGS. 18 through 20 materially simplifies the kickdown and "throttle" pressure controls and eliminates the need for a spring detent or the like to advise the transmission operator when kickdown is established. The arrangement disclosed provides a built-in hydraulic detent means for kickdown operation.

I claim:

1. In an engine driven vehicle having a throttle valve control, a multispeed power transmission unit comprising input and output shafts, gearing interconnecting said shafts and arranged for selective activation to provide for transmission of a first, a second and a third speed drive between said shafts, and automatically operable vehicle speed and throttle valve responsive pressure fluid activatable control means for said gearing arranged to automatically provide for sequential upshifts from first to second to third speed drive and reversely arranged downshifts with the automatic downshift being directly from third speed to first speed during closed and light throttle operation, said automatically operable transmission shift control means including a pair of interconnected pressure fluid operable shift valves each selectively operable by conjointly applied pressure fluid means responsive respectively to the transmission output shaft speed and the degree of throttle valve opening to accomplish said sequential upshifts and downshifts and pressure fluid operated means connecting said shift valves and operable after upshift of each of said valves to apply an anchoring fluid force to the shift valve controlling second speed to third speed shifts whereby downshift from third speed directly to first speed is automatically accomplished during closed and light throttle operation.

2. In an engine driven vehicle having a throttle valve control, a multispeed power transmission unit comprising input and output shafts, planetary gearing interconnecting said shafts and arranged for selective activation to provide for transmission of a first, a second and a third speed drive between said shafts, and automatically operable vehicle speed and throttle valve responsive pressurized fluid activatable control means for said gearing arranged to automatically provide for sequential upshifts from first to second to third speed drive with the automatic downshift being directly from third speed to first speed during closed and light throttle operation while heavy open throttle operation causes automatic, sequential, downshifts from third speed to second speed to first speed, said automatically operable transmission shift control means including a pair of interconnected pressure fluid operable shift valves each selectively operable by conjointly applied pressure fluid means responsive respectively to the transmission output shaft speed and the degree of throttle valve opening to accomplish said sequential upshifts and downshifts and pressure fluid operated means connecting said shift valves and operable after upshift of each of said valves to apply an anchoring fluid force to the shift valve controlling second speed to third speed shifts whereby downshift from third speed directly to first speed is automatically accomplished during closed and light throttle operation, and a first manually operable gearing control to overrule the automatically operable control means and force a downshift from third speed to second speed.

3. In an engine driven vehicle having a throttle valve control, a multispeed power transmission unit comprising input and output shafts, gearing interconnecting said shafts and arranged for selective activation to provide for transmission of a first, a second and a third speed drive between said shafts, and automatically operable vehicle speed and throttle valve responsive pressure fluid activatable control means for said gearing arranged to automatically provide for sequential upshifts from first to second to third speed drive and reversely arranged automatic downshifts with the automatic downshift being directly from third speed to first speed during closed and light throttle operation while heavy open throttle operation causes automatic, sequential, downshift from third speed to second speed to first speed, said automatically operable transmission shift control means including a pair of interconnected pressure fluid operable shift valves each selectively operable by conjointly applied pressure fluid means responsive respectively to the transmission output shaft speed and the degree of throttle valve opening to accomplish said sequential upshifts and downshifts and pressure fluid operated means connecting said shift valves and operable after upshift of each of said valves to apply an anchoring fluid force to the shift valve controlling second speed to third speed shifts whereby downshift from third speed directly to first speed is automatically accomplished during closed and light throttle operation.

4. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, and automatically operable, vehicle speed and engine throttle responsive, control means for said gearing arranged to automatically provide for initiation of all forward drive in first speed with sequential upshifts from first to second to third speed drive and reversely arranged automatic downshifts and the automatic downshift from third speed being directly from third speed to first speed when the engine throttle is anywheres between its closed throttle and a midway open position, said automatically operable transmission shift control means including a pair of interconnected pressure fluid operable shift valves each selectively operated by conjointly applied pressure fluid means responsive respectively to transmission output shaft speed and the degree of throttle valve opening to accomplish said sequential upshifts and downshifts and a pressure fluid operated relay valve connected to said pair of shift valves by pressure fluid means that is arranged to apply a pressure fluid operated anchoring force to the shift valve controlling the second to third speed upshifts and downshifts to prevent an automatic downshift from third speed to second speed when the throttle valve is opened less than substantially midway until after the shift valve controlling the second speed to first speed shift begins a downshifting operation, and a first manually operable gearing control to overrule the automatically operable control means and force a downshift from third speed to second speed, said first manually operable gearing control for forcing a downshift from third speed to second speed being under output shaft speed control so as to be ineffective to accomplish the downshift from third speed to second speed when the output shaft speed is above a predetermined value.

5. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, and automatically operable, vehicle speed and engine throttle responsive, control means for said gearing arranged to automatically provide for initiation of all forward drive in first speed with sequential upshifts from first to second to third speed drive and reversely arranged automatic downshifts and the automatic downshift from third speed being directly from third speed to first speed when the engine throttle is anywheres between its closed throttle and a substantially midway open position, said vehicle speed and engine throttle responsive controls being arranged to provide for an automatic sequential downshift from third speed to second speed and thereafter to first speed if the downshifting is effected during midway open to wide open throttle position, said automatically operable transmission shift control means including a pair of interconnected pressure fluid operable shift valves each selectively operated by conjointly applied pressure fluid means responsive respectively to transmission output shaft speed and the degree of throttle valve opening to accomplish said sequential upshifts and downshifts and a pressure fluid operated relay valve connected to said pair of shift valves by pressure fluid means that is arranged to apply a pressure fluid operated anchoring force to the shift valve controlling the second to third speed upshifts and downshifts to prevent an automatic downshift from third speed to second speed when the throttle valve is opened less than substantially midway until after the shift valve controlling the second speed to first speed shift begins a downshifting operation, and a first manually operable gearing control to overrule the automatically operable control means and force a downshift from third speed to second speed, said first manually operable gearing control for forcing a downshift from third speed to second speed being under output shaft speed control so as to be ineffective to accomplish the downshift from third speed to second speed when the output shaft speed is above a predetermined value.

6. In an engine driven vehicle having an engine throttle control movable between closed throttle and wide open throttle positions, a multispeed power transmission unit comprising input and output shafts, servo-controlled gearing interconnecting said shafts and arranged for selective activation to provide for transmission of a first, a second and a third speed forward drive between said shafts, and automatically operable, vehicle speed and engine throttle movement responsive, servo control means for said gearing arranged to automatically provide for initiation of all forward drive in first speed with sequential upshifts from first to second to third speed drive and reversely arranged automatic downshifts with the automatic downshift from third speed being directly from third speed to first speed whenever the engine throttle is opened less than substantially midway between its wide open and closed positions, said automatically operable transmission shift control means including a pair of interconnected pressure fluid operable shift valves each selectively operated by conjointly applied pressure fluid means responsive respectively to transmission output shaft speed and the degree of throttle valve opening to accomplish said sequential upshifts and downshifts and a pressure fluid operated relay valve connected to said pair of shift valves by pressure fluid means that is arranged to apply a pressure fluid operated anchoring force to the shift valve controlling the second to third speed upshifts and downshifts to prevent an automatic downshift from third speed to second speed when the throttle valve is opened less than substantially midway until after the shift valve controlling the second speed to first speed shift begins a downshifting operation, and a first manually operable gearing control to overrule the automatically operable control means and force a downshift from third speed to second speed, said first manually operable gearing control for forcing a downshift from third speed to second speed being under output shaft speed control so as to be ineffective to accomplish the downshift from third speed to second speed when the output shaft speed is above a predetermined value, said first manually operable gearing control for forcing a downshift from third speed to second speed being effective to condition the automatic control means for automatic upshifts and downshifts between first speed and second speed drive while preventing an automatic upshift to third speed from second speed.

7. In an engine driven vehicle having an engine throttle control movable between closed throttle and wide open throttle positions, a multispeed power transmission unit comprising input and output shafts, servo-controlled gearing interconnecting said shafts and arranged for selective activation to provide for transmission of a first, a second and a third speed forward drive between said shafts, and automatically operable, vehicle speed and engine throttle movement responsive, servo control means for said gearing arranged to automatically provide for initiation of all forward drive in first speed with sequential upshifts from first to second to third speed drive and reversely arranged automatic downshifts with the automatic downshift from third speed being directly from third speed to first speed whenever the engine throttle is opened less than substantially midway between its wide open and closed positions, said automatically operable control means being arranged such that automatic downshift from third speed at times when the engine throttle is between its wide open position and the said midway position effects a downshift from third speed to second speed which is followed by a downshift from second speed to first speed when the vehicle speed has been further reduced, said automatically operable transmission shift control means including a pair of interconnected pressure fluid operable shift valves each selectively operated by conjointly applied pressure fluid means responsive respectively to transmission output shaft speed and the degree of throttle valve opening to accomplish said sequential upshifts and downshifts and a pressure fluid operated relay valve connected to said pair of shift valves by pressure fluid means that is arranged to apply a pressure fluid operated anchoring force to the shift valve controlling the second to third speed upshifts and downshifts to prevent an automatic downshift from third speed to second speed when the throttle valve is opened less than substantially midway until after the shift valve controlling the second speed to first speed shift begins a downshifting operation, and a first manually operable gearing control to overrule the automatically operable control means and force a downshift from third speed to second speed, said first manually operable gearing control for forcing a downshift from third speed to second speed being under output shaft speed control so as to be ineffective to accomplish the downshift from third speed to second speed when the output shaft speed is above a predetermined value, said first manually operable gearing control for forcing a downshift from third speed to second speed being effective to condition the automatic control means for automatic upshifts and downshifts between first speed and second speed drive while preventing an automatic upshift to third speed from second speed.

8. In an engine driven vehicle having an engine throttle control movable between closed throttle and wide open throttle positions, a multispeed power transmission unit comprising input and output shafts, servo-controlled gearing interconnecting said shafts and arranged for selective activation to provide for transmission of a first, a second and a third speed forward drive between said shafts, and automatically operable, vehicle speed and engine throttle movement responsive, servo control means for said gearing arranged to automatically provide for initiation of all forward drive in first speed with sequential upshifts from first to second to third speed drive and reversely arranged automatic downshifts with the automatic downshift from third speed being directly from third speed to first speed whenever the engine throttle is opened less than substantially midway between its wide open and closed positions, said automatically operable control means being arranged such that automatic downshift from third speed at times when the engine throttle is between its wide open position and the said midway position effects a downshift from third speed to second speed which is followed by a downshift from second speed to first speed when the vehicle speed has been further reduced, said automatically operable transmission shift control means including a pair of interconnected pressure fluid operable shift valves each selectively operated by conjointly applied pressure fluid means responsive respectively to transmission output shaft speed and the degree of throttle valve opening to accomplish said sequential upshifts and downshifts and a pressure fluid operated relay valve connected to said pair of shift valves by pressure fluid means that is arranged to apply a pressure fluid operated anchoring force to the shift valve controlling the second to third speed upshifts and downshifts to prevent an automatic downshift from third speed to second speed when the throttle valve is opened less than substantially midway until after the shift valve controlling the second speed to first speed shift begins a downshifting operation.

9. In an engine driven vehicle having an engine throttle control movable between closed throttle and wide open throttle positions, a multispeed power transmission unit comprising input and output shafts, servo-controlled gearing interconnecting said shafts and arranged for selective activation to provide for transmission of a first, a second and a third speed forward drive between said shafts, and automatically operable, vehicle speed and engine throttle movement responsive, servo control means for said gearing arranged to automatically provide for initiation of all forward drive in first speed with sequential upshifts from first to second to third speed drive and reversely arranged automatic downshifts with the automatic downshift from third speed being directly from third speed to first speed whenever the engine throttle is opened less than substantially midway between its wide open and closed positions, said automatically operable transmission shift control means including a pair of interconnected pressure fluid operable shift valves each selectively operated by conjointly applied pressure fluid means responsive respectively to transmission output shaft speed and the degree of throttle valve opening to accomplish said sequential upshifts and downshifts and a pressure fluid operated relay valve connected to said pair of shift valves by pressure fluid means that is arranged to apply a pressure fluid operated anchoring force to the shift valve controlling the second to third speed upshifts and downshifts to prevent an automatic downshift from third speed to second speed when the throttle valve is opened less than substantially midway until after the shift valve controlling the second speed to first speed shift begins a downshifting operation, and a first manually operable gearing control to overrule the automatically operable control means and force a downshift from third speed to second speed.

10. In an engine driven vehicle having an engine throttle control movable between closed throttle and wide open throttle positions, a multispeed power transmission unit comprising input and output shafts, servo-controlled gearing interconnecting said shafts and arranged for selective activation to provide for transmission of a first, a second and a third speed forward drive between said shafts, and automatically operable, vehicle speed and engine throttle movement responsive, servo control means for said gearing arranged to automatically provide for initiation of all forward drive in first speed with sequential upshifts from first to second to third speed drive and reversely arranged automatic downshifts with the automatic downshift from third speed being directly from third speed to first speed whenever the engine throttle is opened less than substantially midway between its wide open and closed positions, said automatically operable transmission shift control means including a pair of interconnected pressure fluid operable shift valves each selectively operated by conjointly applied pressure fluid means responsive respectively to transmission output shaft speed and the degree of throttle valve opening to accomplish said sequential upshifts and downshifts and a pressure fluid operated relay valve connected to said pair of shift valves by pressure fluid means that is arranged to apply a pressure fluid operated anchoring force to the shift valve controlling the second to third speed upshifts and downshifts to prevent an automatic downshift from third speed to second speed when the throttle valve is opened less than substantially midway until after the shift valve controlling the second speed to first speed shift begins a downshifting operation, and a first manually operable gearing control to overrule the automatically operable control means and force a downshift from third speed to second speed, and a second manually operable gearing control for forcing a downshift from third and second speed to first speed before said automatically operable control means would effect such downshifts.

11. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, and automatically operable, vehicle speed and engine throttle responsive, pressure fluid actuated, control means for said gearing arranged to automatically provide for initiation of all forward drive in first speed with sequential upshifts from first to second to third speed drive and the normal automatic downshift from third speed being directly from third speed to first speed when the engine throttle is anywheres between its closed throttle and a substantially midway open position, said automatically operable control means comprising a first differential pressure operated shift valve shiftable between downshifted and upshifted positions to effect changes in speed ratio drive between first speed and second speed, a second differential pressure operated valve shiftable between downshifted and upshifted positions to effect changes in speed ratio drive between second speed and third speed, and a differential pressure operated relay valve connected by pressure fluid means to said first and second valves and arranged to control application of a pressure fluid to said second valve after shift of said first valve to its second speed position and after shift of said second valve to its third speed position whereby said second valve will normally be anchored in its third speed position until said first valve downshifts to its first speed position from its second speed position whereupon said relay valve will be automatically operated to release said second valve for downshift to its second speed position from its third speed position.

12. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, and automatically operable, vehicle speed and engine throttle responsive, pressure fluid actuated, control means for said gearing arranged to automatically provide for initiation of all forward drive in first speed with sequential upshifts from first to second to third speed drive and the normal automatic downshift from third speed being directly from third speed to first speed when the engine throttle is anywheres between its closed throttle and a substantially midway open position, said automatically operable control means comprising a first pressure fluid operated shift valve shiftable between downshifted and upshifted positions to effect changes in speed ratio drive between first speed and second speed, a second pressure fluid operated valve shiftable between downshifted and upshifted positions to effect changes in speed ratio drive between second speed and third speed, and a fluid pressure operated relay valve connected by pressure fluid means to said first and second valves and arranged to control application of a pressure fluid to said second valve after shift of said first valve to its second speed position and after shift of said second valve to its third speed position whereby said second valve will normally be anchored in its third speed position until said first valve downshifts to its first speed position from its second speed position whereupon said relay valve will be automatically operated to release said second valve for downshift to its second speed position from its third speed position.

13. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, and automatically operable, vehicle speed and engine throttle responsive, pressure fluid actuated, control means for said gearing arranged to automatically provide for initiation of all forward drive in first speed with sequential upshifts from first to second to third speed drive and the normal automatic downshift from third speed being directly from third speed to first speed when the engine throttle is anywheres between its closed throttle and a substantially midway open position, said automatically operable control means comprising a first pressure fluid operated shift valve shiftable between downshifted and upshifted position to effect changes in speed ratio drive between first speed and second speed, a second pressure fluid operated valve shiftable between downshifted and upshifted positions to effect changes in speed ratio drive between second speed and third speed, and a fluid pressure operated relay valve connected by pressure fluid means to said first and second valves and arranged to control application of a pressure fluid to said second valve after shift of said first valve to its second speed position and after shift of said second valve to its third speed position whereby said second valve will normally be anchored in its third speed position until said first valve downshifts to its first speed position from its second speed position whereupon said relay valve will be automatically operated to release said second valve for downshift to its second speed position from its third speed position, said relay valve having an operating fluid applied thereto that is responsive to the degree of opening of the engine throttle.

14. In a engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, and automatically operable, vehicle speed and engine throttle responsive, pressure fluid actuated, control means for said gearing arranged to automatically provide for initiation of all forward drive in first speed with sequential upshifts from first to second to third speed drive and the normal automatic downshift from third speed being directly from third speed to first speed when the engine throttle is anywhereas between its closed throttle and a substantially midway open position, said automatically operable control means comprising a first pressure fluid operated shift valve shiftable between downshifted and upshifted positions to effect changes in speed ratio drive between first speed and second speed, a second pressure fluid operated valve shiftable between downshifted and upshifted positions to effect changes in speed ratio drive between second speed and third speed, and a fluid pressure operated relay valve connected by pressure fluid means to said first and second valves and arranged to control application of a pressure fluid to said second valve after shift of said first valve to its second speed position and after shift of said second valve to its third speed position whereby said second valve will normally be anchored in its third speed position until said first valve downshifts to its first speed position from its second speed position whereupon said relay valve will be automatically operated to release said second valve for downshift to its second speed position from its third speed position, said relay valve having an operating fluid applied thereto that is responsive to the degree of opening of the engine throttle, and another operating fluid applied thereto that is of substantially constant intensity and that is controlled by the shifting movement of said second pressure fluid operated valve.

15. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, and automatically operable, vehicle speed and engine throttle responsive, pressure fluid actuated, control means for said gearing arranged to automatically provide for initiation of all forward drive in first speed with sequential upshifts from first to second to third speed drive and the normal automatic downshift from third speed being directly from third speed to first speed, a first source of pressure fluid responsive to the output shaft speed, a second source of pressure fluid responsive to the degree of throttle opening, and a third source of pressure fluid of a substantially constant pressure, said automatically operable control means comprising a first differential pressure operated shift valve operable by said speed responsive and throttle responsive pressure fluids and shiftable between downshifted and upshifted positions to effect changes in speed ratio drive between first speed and second speed, a second differential pressure operated valve operable by said speed responsive and throttle responsive pressure fluids and shiftable between downshifted and upshifted positions to effect changes in speed ratio drive between second speed and third speed, and a differential pressure operated relay valve connected by pressure fluid means to said first and second valves and operable by said throttle responsive and said constant pressure fluids, said relay valve being arranged to control application of said constant pressure fluid to a portion of said second valve after shift of said first valve to its second speed position and after shift of said second valve to its third speed position whereby said second valve will normally be anchored in its third speed position until said first valve downshifts to its first speed position from its second speed position whereupon said relay valve will be automatically operated to release said second valve for downshift to its second speed position from its third speed position.

16. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, a one-way brake engageable for activation of first speed, a pressure fluid operated brake engageable for activation of second speed and a pressure fluid operated clutch engageable for activation of third speed, and automatically operable, vehicle speed and engine throttle responsive, pressure fluid operated, control means for said brakes and clutch arranged to automatically provide for initiation of all forward drive in first speed with sequential upshifts from first to second to third speed drive and the normal automatic downshift from third speed being directly from third speed to first speed when the engine throttle is anywheres between its closed throttle and a midway open position, said automatically operable control means being effective to provide an automatic downshift from third speed to second speed and subsequently from second speed to first speed when the downshifting occurs with the throttle valve opened beyond its substantially midway open position, said automatically operable control means including a first source of pressure fluid responsive to the speed of the transmisison output shaft, a second source of pressure fluid responsive to the degree of opening of the engine throttle valve and a third source of substantially constant pressure fluid, a first pressure fluid operated shift valve to control alternate activation of first and second speed, a second pressure fluid operated shift valve to control alternate activation of second and third speed, and a pressure fluid operated relay valve connected by pressure fluid means to said first and second shift valves and to said second and third sources of fluid pressure and arranged to apply a pressure fluid to said second shift valve after shift thereof to its upshifted third speed position whereby said second shift valve will be retained in its third speed position until said first shift valve is downshifted to its first speed position.

17. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, a one-way brake engageable for activation of first speed, a pressure fluid operated brake engageable for activation of second speed and a pressure fluid operated clutch engageable for activation of third speed, and automatically operable, vehicle speed and engine throttle responsive, pressure fluid operated, control means for said brakes and clutch arranged to automatically provide for initiation of all forward drive in first speed with sequential upshifts from first to second to third speed drive and the normal automatic downshift from third speed being directly from third speed to first speed, said automatically operable control means including a first source of pressure fluid responsive to the speed of the transmission output shaft, a second source of pressure fluid responsive to the degree of opening of the engine throttle valve and a third source of substantially constant pressure fluid, a first pressure fluid operated shift valve to control alternate activation of first and second speed, a second pressure fluid operated shift valve to control alternate activation of second and third speed, and a pressure fluid operated relay valve connected by pressure fluid means to said first and second shift valves and to said second and third sources of fluid pressure and arranged to apply a pressure fluid to said second shift valve after shift thereof to its upshifted third speed position whereby said second shift valve will be retained in its third speed position until said first shift valve is downshifted to its first speed position.

18. In an engine driven vehicle having a throttle control movable between closed and wide open throttle positions, a multispeed power transmission unit comprising input and output shafts, gearing interconnecting said shafts and arranged for selective activation to provide for transmisison of a first, a second and a third speed forward drive between said shafts, a one-way brake engageable for activation of first speed, a pressure fluid operated brake engageable for activation of second speed and a pressure fluid operated clutch engageable for activation of third speed, and automatically operable, vehicle speed and engine throttle responsive, pressure fluid operated, control means for said brakes and clutch arranged to automatically provide for initiation of all forward drive in first speed with sequential upshifts from first to second to third speed drive and the normal automatic downshift from third speed being directly from third speed to first speed, said automatically operable control means including a first source of pressure fluid responsive to the speed of the transmission output shaft, a second source of pressure fluid responsive to the degree of opening of the engine throttle valve and a third source of substantially constant pressure fluid, a first pressure fluid operated shift valve to control alternate activation of first and second speed, a second pressure fluid operated shift valve to control alternate activation of second and third speed, and a pressure fluid operated relay valve connected by pressure fluid means to said first and second shift valves and to said second and third sources of fluid pressure and arranged to apply a pressure fluid to said second shift valve after shift thereof to its upshifted third speed position whereby said second shift valve will be retained in its third speed position until said first shift valve is downshifted to its first speed position and a pressure fluid containing accumulator connected to said second speed brake and said third speed clutch operable to cushion the alternate engagement of said second speed brake and said third speed clutch upon shifts between second and third speeds.

19. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, and automatically operable, vehicle speed and engine throttle responsive, pressure fluid actuated, control means for said gearing arranged to automatically provide for initiation of all forward drive in first speed with sequential upshifts from first to second to third speed drive and for a normal automatic downshift directly from third speed to first speed, a first source of pressure fluid responsive to the output shaft speed, a second source of pressure fluid responsive to the degree of throttle opening, and a third source of pressure fluid of a substantially constant pressure, said automatically operable control means comprising a first differential pressure operated shift valve operable by said speed responsive and throttle responsive pressure fluids and shiftable between downshifted and upshifted positions to effect changes in speed ratio drive between first speed and second speed, a second differential pressure operated shift valve operable by said speed responsive and throttle responsive pressure fluids and shiftable between downshifted and upshifted positions to effect changes in speed ratio drive between second speed and third speed, and a differential pressure operated relay valve connected by pressure fluid means to said first and second valves and operable by said throttle responsive and said constant pressure fluids, said relay valve being arranged to control application of one of said pressure fluids to a portion of said second shift valve after shift of said first shift valve to its second speed position and after shift of said second shift valve to its third speed position whereby said second shift valve will normally be anchored in its third speed position until said first shift valve downshifts to its first speed position from its second speed position whereupon said relay valve will be automatically operated to release said second shift valve for downshift to its second speed position from its third speed position.

20. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, and automatically operable, vehicle speed and engine throttle responsive, pressure fluid actuated, control means for said gearing arranged to automatically provide for initiation of all forward drive in first speed with sequential upshifts from first to second to third speed drive and for a normal automatic downshift directly from third speed to first speed, a first source of pressure fluid responsive to the output shaft speed, a second source of pressure fluid responsive to the degree of throttle opening, and a third source of pressure fluid of a substantially constant pressure, said automatically operable control means comprising a first differential pressure operated shift valve operable by the differential between said speed responsive and throttle responsive pressure fluids and shiftable between downshifted and upshifted positions to effect changes in speed ratio drive between first speed and second speed, a second differential pressure operated shift valve operable by the differential between said speed responsive and throttle responsive pressure fluids and shiftable between downshifted and upshifted positions to effect changes in speed ratio drive between second speed and third speed, and a differential pressure operated relay valve connected by pressure fluid means to said first and second valves and operable by the differential between said throttle responsive and said constant pressure fluids, said relay valve being arranged to control application of said constant pressure fluid to a portion of said second shift valve after shift of said first shift valve to its second speed position and after shift of said second shift valve to its third speed position whereby said second shift valve will normally be anchored in its third speed position until said first shift valve downshifts to its first speed position from its second speed position whereupon said relay valve will be automatically operated to cut off supply of constant pressure fluid to said portion of said second shift valve and thereby release said second shift valve for downshift to its second speed position from its third speed position at the same time said first shift valve downshifts from its second speed to its first speed position.

21. In a control system for a transmission as set forth in claim 20 wherein means are included to prevent the normal third speed to first speed downships when the throttle responsive pressure fluid is above a predetermined value such that the downshift pattern will then be third speed to second speed with a subsequent downshift to first speed from second speed when the output shaft speed has been further reduced.

22. In a control system for a transmission as set forth in claim 20 wherein the said output shaft speed responsive pressure fluids applied to the first and second shift valves are of different intensities with the intensity of the speed responsive pressure fluid applied to the first shift valve being greater than the corresponding speed responsive pressure fluid applied to the second shift valve to thereby assist in spacing the shift points of the said first and second shift valves.

23. In a control system as set forth in claim 22 wherein the means for providing different intensity output shaft speed responsive pressure fluids for said first and second shift valves includes a differential pressure operated compensator valve that has pressure fluids from said first source of output shaft responsive source and said third source of constant pressure fluid simultaneously applied thereto to provide the higher intensity speed responsive pressure fluid for said first shift valve.

24. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, a one-way brake engageable for activation of first speed, a pressure fluid operated brake engageable for activation of second speed and a pressure fluid operated clutch engageable for activation of third speed, and automatically operable, vehicle speed and engine throttle responsive, pressure fluid operated, control means for said brakes and clutch arranged to automatically provide for initiation of all forward drive in first speed with sequential upshifts from first to second to third speed drive and the normal automatic downshift from third speed being directly from third speed to first speed when the engine throttle is anywhere between its closed throttle and a midway open position, said automatically operable control means being effective to provide an automatic downshift from third speed to second speed and subsequently from second speed to first speed when the downshifting occurs with the throttle valve opened beyond its substantially midway open position, said automatically operable transmission shift control means including a pair of interconnected pressure fluid operable shift valves each selectively operated by conjointly applied pressure fluid means responsive respectively to transmission output shaft speed and the degree of throttle valve opening to accomplish said sequential upshifts and downshifts and a pressure fluid operated relay valve connected to said pair of shift valves by pressure fluid means that is arranged to apply a pressure fluid operated anchoring force to the shift valve controlling the second to third speed upshifts and downshifts to prevent an automatic downshift from third speed to second speed when the throttle valve is opened less than substantially midway until after the shift valve controlling the second speed to first speed shift begins a downshifting operation.

25. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, a one-way brake engageable for activation of first speed, a pressure fluid operated brake engageable for activation of second speed and a pressure fluid operated clutch engageable for activation of third speed, and automatically operable, vehicle speed and engine throttle responsive, pressure fluid operated, control means for said brakes and clutch arranged to automatically provide for initiation of all forward drive in first speed with sequential upshifts from first to second to third speed drive and the normal automatic downshift from third speed being directly from third speed to first speed when the engine throttle is anywhere between its closed throttle and a midway open position, said automatically operable control means being effective to provide an automatic downshift and third speed to second speed and subsequently from second speed to first speed when the downshifting occurs with the throttle valve opened beyond its substantially midway open position, said automatically operable transmission shift control means including a pair of interconnected pressure fluid operable shift valves each selectively operated by conjointly applied pressure fluid means responsive respectively to transmission output shaft speed and the degree of throttle valve opening to accomplish said sequential upshifts and downshifts and a pressure fluid operated relay valve connected to said pair of shift valves by pressure fluid means that is arranged to apply a pressure fluid operated anchoring force to the shift valve controlling the second to third speed upshifts and downshifts to prevent an automatic downshift from third speed to second speed when the throttle valve is opened less than substantially midway until after the shift valve controlling the second speed to first speed shift begins a downshifting operation, and a manually operable control means to overrule the automatically operable control means and force a downshift from third speed to second speed.

26. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, a one-way brake engageable for activation of first speed, a pressure fluid operated brake engageable for activation of second speed and a pressure fluid operated clutch engageable for activation of third speed, and automatically operable, vehicle speed and engine throttle responsive, pressure fluid operated, control means for said brakes and clutch arranged to automatically provide for initiation of all forward drive in first speed with sequential upshifts from first to second to third speed drive and the normal automatic downshift from third speed being directly from third speed to first speed when the engine throttle is anywheres between its closed throttle and a midway open position, said automatically operable control means being effective to provide an automatic downshift from third speed to second speed and subsequently from second speed to first speed when the downshifting occurs with the throttle valve opened beyond its substantially midway open position, and a manually operable control means to overrule the automatically operable control means and force a downshift from third speed to second speed, said automatic control means including output shaft speed responsive means that will prevent the manually operated forced downshift from third speed to second speed when the output shaft speed is above a predetermined speed.

27. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, a one-way brake engageable for activation of first speed, a pressure fluid operated brake engageable for activation of second speed and a pressure fluid operated clutch engageable for activation of third speed, and automatically operable, vehicle speed and engine throttle responsive, pressure fluid operated, control means for said brakes and clutch arranged to automatically provide for initiation of all forward drive in first speed with sequential upshifts from first to second to third speed drive and the normal automatic downshift from third speed being directly from third speed to first speed when the engine throttle is anywheres between its closed throttle and a midway open position, said automatically operable control means being effective to provide an automatic downshift from third speed to second speed and subsequently from second to first speed when the downshifting occurs with the throttle valve opened beyond its substantially midway open position, a first manually operable control means to overrule the automatically operable control means and force a downshift from third speed to second speed, and a second manually operable control means to overrule said automatically operable control means and force a downshift from third speed and second speed to first speed.

28. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, a one-way brake engageable for activation of first speed, a pressure fluid operated brake engageable for activation of second speed and a pressure fluid operated clutch engageable for activation of third speed, and automatically operable, vehicle speed and engine throttle responsive, pressure fluid operated, control means for said brakes and clutch arranged to automatically provide for initiation of all forward drive in first speed with sequential upshifts from first to second to third speed drive and the normal automatic downshift from third speed being directly from third speed to first speed when the engine throttle is anywheres between its closed throttle and a midway open position, said automatically operable control means being effective to provide an automatic downshift from third speed to second speed and subsequently from second speed to first speed when the downshifting occurs with the throttle valve opened beyond its substantially midway open position, a first manually operable control means to overrule the automatically operable control means and force a downshift from third speed to second speed, and a second manually operable control means to overrule said automatically operable control means and force a downshift from third speed and second speed to first speed, said automatic control means including output shaft speed responsive means that will prevent the manually operated forced downshift from third speed to first speed when the output shaft speed is above a predetermined speed.

29. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, a one-way brake engageable for activation of first speed, a pressure fluid operated brake engageable for activation of second speed and a pressure fluid operated clutch engageable for activation of third speed, and automatically operable, vehicle speed and engine throttle responsive, pressure fluid operated, control means for said brakes and clutch arranged to automatically provide for initiation of all forward drive in first speed with sequential upshifts from first to second to third speed drive and the normal automatic downshift from third speed being directly from third speed to first speed when the engine throttle is anywheres between its closed throttle and a midway open position, said automatically operable control means being effective to provide an automatic downshift from third speed to second speed and subsequently from second speed to first speed when the downshifting occurs with the throttle valve opened beyond its substantially midway open position, a first manually operable control means to overrule the automatically operable control means and force a downshift from third speed to second speed, and a second manually operable control means to overrule said automatically operable control means and force a downshift from third speed and second speed to first speed, said automatic control means including output shaft speed responsive means that will prevent the manually operated forced downshift from third speed to first speed when the output shaft speed is above a predetermined speed, but which will produce a forced downshift to second speed from third speed when the output shaft speed is above said predetermined speed with a subsequent automatic downshift from second speed to first speed when the output shaft speed subsequently drops below said predetermined speed.

30. In an engine driven vehicle having a throttle control movable between closed and wide open throttle positions, a multispeed power transmission unit comprising input and output shafts, gearing interconnecting said shafts, a one-way brake engageable for activation of said gearing to provide for transmission of a first speed, a pressure fluid operated brake engageable for activation of said gearing to provide for transmission of a second speed drive, and a pressure fluid operated clutch engageable for activation of said gearing to provide for transmission of a third speed drive, and automatically operable, vehicle speed and engine throttle responsive, pressure fluid actuated, control means for said gearing arranged to automatically provide for initiation of all forward drive in first speed with sequential upshifts from first to second to third speed drive and the normal automatic downshift from third speed being directly from third speed to first speed, a first source of pressure fluid responsive to the output shaft speed, a second source of pressure fluid responsive to the degree of throttle opening, and a third source of pressure fluid of a substantially constant pressure, said automatically operable control means comprising a first differential pressure operated shift valve operable by said speed responsive and throttle responsive pressure fluids and shiftable between downshifted and upshifted positions to alternately activate said one-way brake and said pressure fluid operated brake to effect changes in speed ratio drive between first speed and second speed, a second differential pressure operated shift valve operable by said speed responsive and throttle responsive pressure fluids and shiftable between downshifted and upshifted positions to alternately activate said pressure fluid operated brake and clutch to effect changes in speed ratio drive been second speed and third speed, and a differential pressure operated relay valve connected to said first and second valves and operable by said throttle responsive and said constant pressure fluids, said relay valve being arranged to control application of said constant pressure fluid to a portion of said second shift valve after shift of said first shift valve to its second speed position and after shift of said second shaft valve to its third speed position whereby said second shift valve will normally be anchored in its third speed position until said first shift valve downshifts to its first speed position from its second speed position whereupon said relay valve will be automatically operated to release said second shift valve for downshift to its second speed position from its third speed position.

31. In a transmission as set forth in claim 30 wherein means are provided under control of said first source of speed responsive pressure fluid to overrule said normal third speed to first speed downshift control means and to effect a third speed to second speed downshift that is followed by a second speed to first speed downshift when the output shaft speed has been further reduced.

32. In a transmission as set forth in claim 30 wherein manually operable transmission control means are provided to overrule the automatically operable control means and effect a downshift from third speed to second speed at the will of the operator.

33. In a transmission as set forth in claim 32 wherein output shaft speed responsive means will delay the manually operable downshift from third speed to first speed until the output shaft speed drops below a predetermined value.

34. In a transmission as set forth in claim 30 wherein a first manually operable transmission control means is provided to overrule said automatically operable control means and to restrict said transmission to operation in first speed.

35. In a transmission as set forth in claim 34 wherein a second manually operable transmission control means is provided to overrule the aforementioned automatically operable control means and limit said transmission to automatic operation in first and second speeds.

36. In a transmission as set forth in claim 35 wherein output shaft speed responsive means are provided to overrule the second manually operable transmission control means and automatically upshift the transmission from second speed to third speed if the output shaft speed in second speed drive should attain a predetermined speed with an automatic downshift to second speed from third speed when the output shaft speed falls below said predetermined speed.

37. In an engine driven vehicle having a throttle control movable between closed and wide open throttle positions, a multispeed power transmission unit comprising input and output shafts, gearing interconnecting said shafts, a first pressure fluid operate brake and a one-way brake engageable for activation of said gearing to provide for transmission of a first speed, a second pressure fluid operated brake engageable for activation of said gearing to provide for transmission of a second speed drive, and a pressure fluid operated clutch engageable for activation of said gearing to provide for transmission of a third speed drive, and automatically operable, vehicle speed and engine throttle responsive, pressure fluid actuated, control means for said gearing arranged to automatically provide for initiation of all forward drive in a one-way drive first speed with sequential upshifts from said one-way first speed to second speed to third speed drive and the normal automatic downshifts from third speed being directly from third speed to said one-way first speed, a first source of pressure fluid responsive to the output shaft speed, a second source of pressure fluid responsive to the degree of throttle opening, and a third source of pressure fluid of a substantially constant pressure, said automatically operable control means comprising a first differential pressure operated shift valve operable by said speed responsive and throttle responsive pressure fluids and shiftable between downshifted and upshifted positions to alternately activate said one-way brake and said second pressure fluid operated brake to effect changes in speed ratio drive between said one-way first speed and second speed, a second differential pressure operated shift valve operable by said speed responsible and throttle responsive pressure fluids and shiftable between downshifted and upshifted positions to alternately activate said pressure fluid operated brake and clutch to effect changes in speed ratio drive between second speed and third speed, a differential pressure operated relay valve connected to said first and second valves and operable by said throttle responsive and said constant pressure fluids, said relay valve being arranged to control application of said constant pressure fluid to a portion of said second shift valve after shift of said first shift valve to its second speed position and after shift of said second shift valve to its third speed position whereby said second shift valve will normally be anchored in its third speed position until said first shift valve downshifts to its first speed position from its second speed position whereupon said relay valve will be automatically operated to release said second shift valve for downshift to its second speed position from its third speed position, and manually operable means to overrule said automatically operable control means and activate said first fluid pressure operated brake to provide means for the transmission of a two-way first speed drive.

38. In an engine driven vehicle having a throttle control movable between closed and wide open throttle positions, a multispeed power transmission unit comprising input and output shafts, gearing interconnecting said shafts and arranged for selective activation to provide for transmission of a first, a second and a third speed forward drive between said shafts, a one-way brake engageable for activation of first speed, a pressure fluid operated brake engageable for activation of second speed and a pressure fluid operated clutch engageable for activation of third speed, and automatically operable, vehicle speed and engine throttle responsive, pressure fluid operated, control means for said brakes and clutch arranged to automatically provide for initiation of all forward drive in first speed with sequential upshifts from first to second to third speed drive and the normal automatic downshift from third speed being directly from third speed to first speed, said automatically operable control means including a first source of pressure fluid responsive to the speed of the transmission output shaft, a second source of pressure fluid responsive to the degree of opening of the engine throttle valve and a third source of substantially constant pressure fluid, a first pressure fluid operated shift valve to control alternate activation of first and second speed, a second pressure fluid operated shift valve to control alternate activation of second and third speed, a pressure fluid operated relay valve to normally effect the third speed to first speed downshift, a shuttle valve connected to said second shift valve and said pressure fluid operated brake and clutch to control the rate of engagement and release of said pressure fluid operated brake and clutch, said shuttle valve being connected to and operated solely by the differential force applied to said shuttle valve by the vehicle speed responsive and throttle responsive pressure fluids, conduit means connecting said source of constant pressure fluid to said pressure fluid operated brake and clutch by way of said shuttle valve, branch conduits to bypass said constant pressure fluid around said shuttle valve, and flow restriction means in said branch conduits.

References Cited in the file of this patent

UNITED STATES PATENTS

| | | |
|---|---|---|
| 2,338,546 | Scholl | Jan. 4, 1944 |
| 2,643,663 | Gold et al. | June 30, 1953 |
| 2,703,500 | Roche | Mar. 8, 1955 |
| 2,711,656 | Smirl | June 28, 1955 |

(Other references on following page)

UNITED STATES PATENTS

| | | |
|---|---|---|
| 2,721,640 | De Foe et al. | Oct. 25, 1955 |
| 2,726,557 | Ackerman | Dec. 13, 1955 |
| 2,733,732 | Baker | Feb. 7, 1956 |
| 2,738,689 | Dodge | Mar. 20, 1956 |
| 2,766,639 | Rosenberger | Oct. 16, 1956 |
| 2,788,678 | Sheppard | Apr. 16, 1957 |
| 2,791,913 | Slack | May 14, 1957 |
| 2,792,716 | Christenson | May 21, 1957 |
| 2,856,794 | Simpson | Oct. 21, 1958 |
| 2,873,618 | De Lorean | Feb. 17, 1959 |

UNITED STATES PATENT OFFICE
CERTIFICATION OF CORRECTION

Patent No. 3,000,230                        September 19, 1961

Leonard E. Froslie

It is hereby certified that error appears in the above numbered patent requiring correction and that the said Letters Patent should read as corrected below.

Column 7, line 19, for "iin" read -- in --; line 32, after "five" insert -- drive --; column 15, line 27, after "by-pass" insert -- around --; column 20, line 70, before "explains" insert -- clearly --; column 22, line 70, for "position" read -- positions --; column 27, line 52, for "anywhereas" read -- anywheres --; column 31, line 28, for "downships" read -- downshift --; column 33, line 35, after "second" insert -- speed --; column 34, line 74, for "been" read -- between --; column 36, line 6, for "responsible" read -- responsive --.

Signed and sealed this 17th day of April 1962.

(SEAL)
Attest:

ESTON G. JOHNSON
Attesting Officer

DAVID L. LADD
Commissioner of Patents